(12) United States Patent
Sofuoglu

(10) Patent No.: US 12,500,826 B2
(45) Date of Patent: Dec. 16, 2025

(54) DYNAMIC USER-PLANE LATENCY REDUCTION IN CELLULAR WIRELESS NETWORKS

(71) Applicant: P.I. WORKS U.S., INC., Reston, VA (US)

(72) Inventor: Ahmet Serkan Sofuoglu, San Ramon, CA (US)

(73) Assignee: P.I. Works U.S., Inc., Reston, VA (US)

( * ) Notice: Subject to any disclaimer, the term of this patent is extended or adjusted under 35 U.S.C. 154(b) by 430 days.

(21) Appl. No.: 18/300,686

(22) Filed: Apr. 14, 2023

(65) Prior Publication Data

US 2024/0348523 A1    Oct. 17, 2024

(51) Int. Cl.
*H04L 43/0852* (2022.01)
*H04L 43/16* (2022.01)

(52) U.S. Cl.
CPC .......... *H04L 43/0852* (2013.01); *H04L 43/16* (2013.01)

(58) Field of Classification Search
CPC .................................................. H04L 43/0852
See application file for complete search history.

(56) References Cited

U.S. PATENT DOCUMENTS

| | | | |
|---|---|---|---|
| 9,420,470 B2 | 8/2016 | Caldenhoven et al. | |
| 9,692,534 B2* | 6/2017 | Jones | H04W 72/30 |
| 10,116,373 B1 | 10/2018 | Marupaduga et al. | |
| 11,303,336 B1 | 4/2022 | Marupaduga | |
| 2016/0021554 A1* | 1/2016 | Behravan | H04W 24/02 455/63.1 |
| 2017/0272990 A1* | 9/2017 | Mutikainen | H04W 36/0069 |
| 2018/0019952 A1* | 1/2018 | Li | H04L 69/161 |
| 2020/0044931 A1* | 2/2020 | Boon | H04L 43/10 |
| 2022/0385550 A1* | 12/2022 | Villasante | H04L 43/026 |
| 2025/0175834 A1* | 5/2025 | Bin Redhwan | H04W 24/10 |

* cited by examiner

*Primary Examiner* — Abdullahi E Salad
(74) *Attorney, Agent, or Firm* — Intrinsic Law Corp.

(57) ABSTRACT

A method for dynamic radio framing includes determining, with a network component of a cellular wireless network, that a transmission of application data packets through the cellular wireless network between a cellular mobile device and an application server is covered by a local latency policy, the cellular mobile device running an application that is associated with the application server. The network component sets one or more latency alert flags in a header of a second data packet when the user-plane packet delay(s), determined using first timestamps appended to header data of a first data packet, is/are higher than respective user-plane latency threshold(s) defined in the local latency policy. The base station dynamically changes, in response to the latency alert flag(s) and second timestamps associated with the second data packet, one or more radio-framing parameters to reduce a data-transmission latency between the base station and the cellular mobile device.

18 Claims, 12 Drawing Sheets

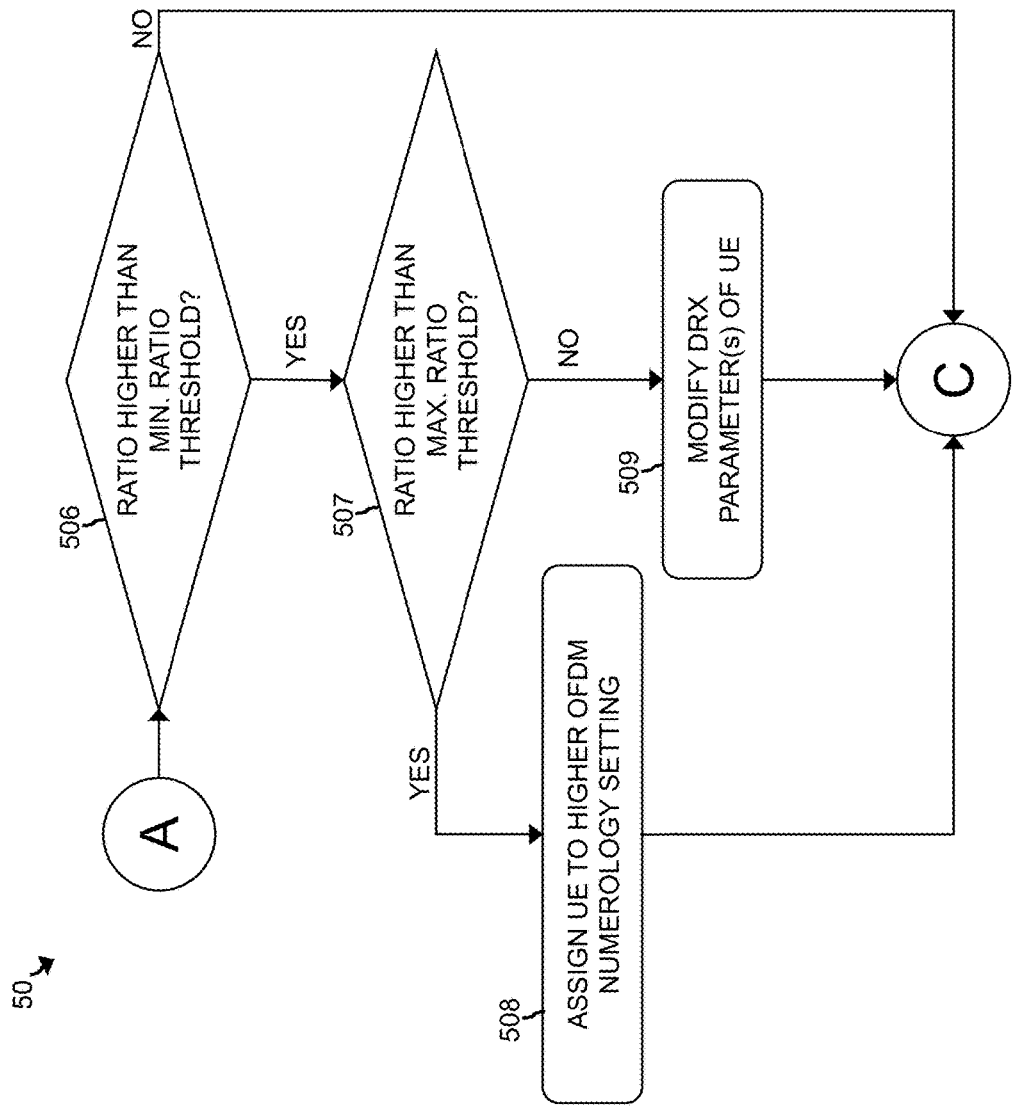

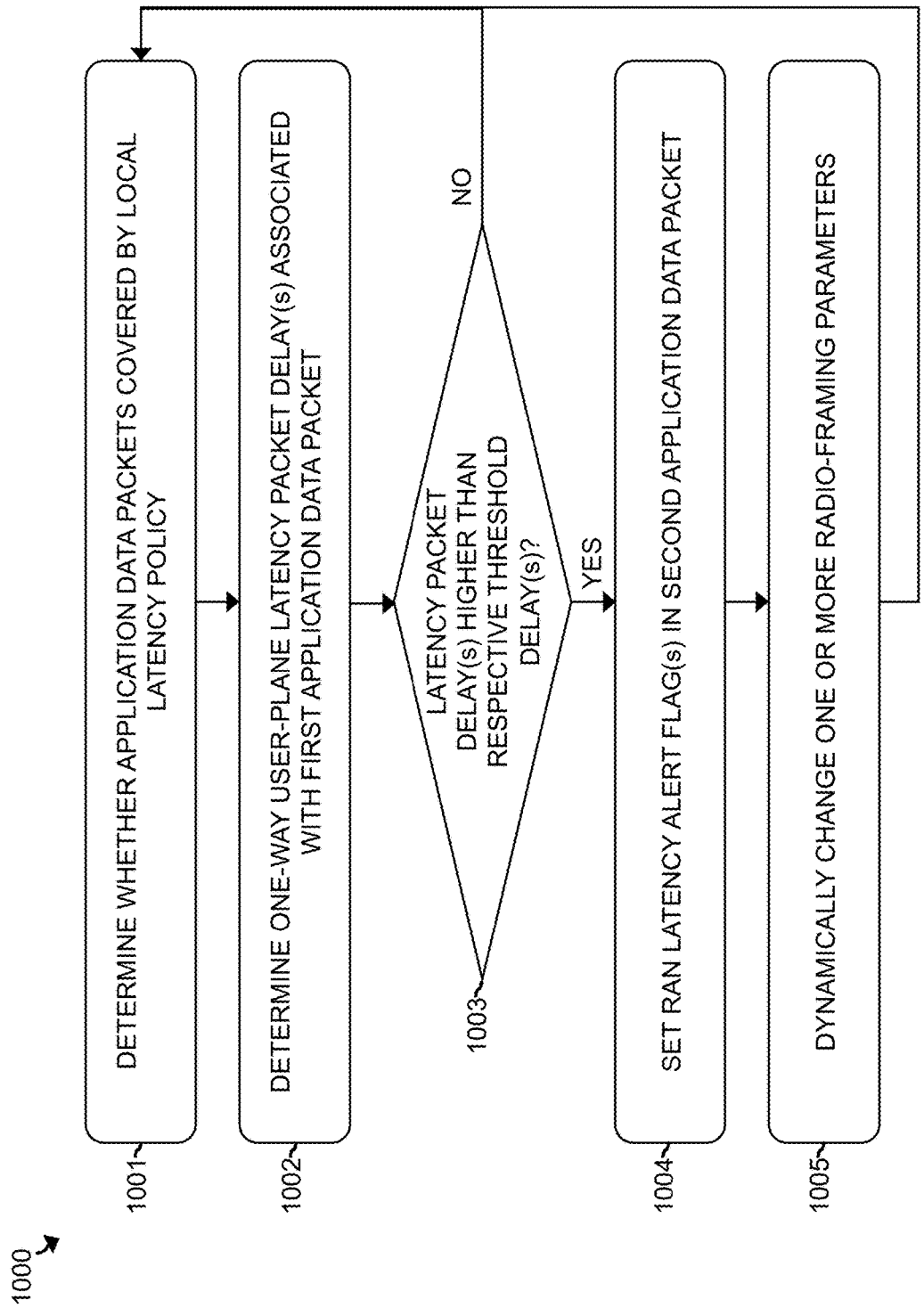

DYNAMIC USER-PLANE LATENCY REDUCTION IN CELLULAR WIRELESS NETWORKS

TECHNICAL FIELD

This application relates generally to cellular wireless networks.

BACKGROUND 5G networks adjust their behavior on transported data based on predefined and standardized definitions using indicators like 5QI (5G Quality Indicator). On-demand services where spontaneous transactions occur (e.g., Uber, Lift, Amazon services over the internet) typically share the same mobile communication bearer medium with other social media internet applications like (WhatsApp, Twitter, Instagram, FB, Google). These applications collectively are also referred as over-the-top (OTT) because they run over communication bearers provided by underlying carrier networks like 5G.

The OTT applications are assigned to a best-effort type 5QI with a default quality-of-service (QoS) Flow in a cellular wireless communication network. For on-demand OTT services, the best-effort type 5QI may limit the number of transactions that the application service provider can execute during surges in on-demand service requests. For example, when 20,000 people leave a stadium after a concert and start using their Uber applications to call for rides, the best-effort type 5QI may result in communication delays (user-plane latency) that may frustrate users and cause them to switch to competitor applications such as Lyft. Another scenario would be a venue where sales of food and drink occur within a limited half-time break period, to reduce queue times, an application may receive special treatment by quicker handling of user-plane data so that more transactions may occur within the limited time window.

Latency is a time-based metric used in packet communication to express the delay (typically expressed in milliseconds (ms)) for a packet to travel from point A (e.g., user device) to point B (e.g., an application server) or reverse. This measure helps to understand how quickly a user can receive data/services from the application server. A high amount of latency causes poor application performance and can cause end users to quit using the application. Main factors affecting latency are physical distance between end points (e.g., 100 miles with 5-10 ms delays) and telecommunication technologies used in between (e.g., cellular (LTE, 5G), WiFi, satellite, microwave (MW), fixed lines, Ethernet, fiber optic lines).

In order to setup and maintain a data session between the end user and an application server, back and forth sending of packets is required thus double the latency duration required for each packet to be acknowledged by the receiving end. In order to reduce overall latency, one method is to store content and/or application servers closer to end users. Although this method may reduce latency on non-radio data network portion, a 5G cellular network still may introduce 300 ms (1000 ms if satellite involved) of latency on a non-guaranteed bit rate (GBR) type best-effort type 5QI. This prevents cellular carriers from being able to provide value-added performance to end users when they use OTT on-demand services transaction involved on-demand OTT services carried over non-GBR best effort type QoS flows especially during a surge of demand on application usage level data.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a method for dynamic radio framing in a cellular wireless network, comprising: determining, with a network component of the cellular wireless network, that a transmission of application data packets through the cellular wireless network between a cellular mobile device and an application server is covered by a local latency policy, the cellular mobile device running an application that is associated with the application server; determining, with the network component, one or more user-plane latency packet delays associated with the application data packets, the one or more user-plane packet delays determined using first timestamps appended to header data of a first data packet, the first data packet sent from the cellular wireless network to the cellular mobile device and from the cellular mobile device to the cellular wireless network; when the one or more user-plane packet delays is/are higher than respective one or more user-plane latency thresholds defined in the local latency policy, appending and setting, by the network component, one or more latency alert flags in a header of a second data packet sent from the network component to a base station; and dynamically changing, with the base station in response to the one or more latency alert flag(s) and second timestamps associated with the second data packet, one or more radio-framing parameters to reduce a data-transmission latency between the base station and the cellular mobile device.

In one or more embodiments, the local latency policy defines on-demand service application traffic descriptors. In one or more embodiments, the on-demand service application traffic descriptors include traffic filtering data and/or time window data.

In one or more embodiments, the one or more user-plane packet delays include a one-way radio ratio user-plane packet delay defined as a ratio of a one-way radio user-plane packet delay with respect to a one-way end-to-end user-plane packet delay, the one-way radio user-plane packet delay defined between the network component and the cellular mobile device, the one-way radio user-plane packet delay defined between the base station and the cellular mobile device, the respective one or more user-plane latency thresholds include a minimum one-way radio ratio user-plane latency threshold, and the one or more latency alert flags include a minimum RAN latency alert radio-ratio latency indication flag, the minimum RAN latency alert radio-ratio latency indication flag set and appended when the one-way radio ratio user-plane packet delay is higher than the minimum one-way radio ratio user-plane latency threshold. In one or more embodiments, the respective one or more user-plane latency thresholds include a maximum one-way radio ratio user-plane latency threshold, and the one or more latency alert flags include a maximum RAN latency alert radio-ratio latency indication flag, the maximum RAN latency alert radio-ratio latency indication flag set and appended when the one-way radio ratio user-plane packet delay is higher than the maximum one-way radio ratio user-plane latency threshold. In one or more embodiments, the minimum RAN latency alert radio-ratio latency indication flag set and appended when the one-way radio ratio user-plane packet delay is between the minimum one-way radio ratio user-plane latency threshold and the maximum one-way radio ratio user-plane latency threshold.

In one or more embodiments, the base station and the network component are time-synchronized, the one or more user-plane packet delays include a relative UL/DL packet delay that compares a downlink (DL) packet delay from the network component to the base station to an uplink (UL) packet delay from the base station to the network component, the respective one or more user-plane latency thresholds include a maximum DL/UL delay difference between the DL packet delay and the UL packet delay, and the one or more latency alert flags include a RAN latency alert UL/DL latency indication flag, the RAN latency alert UL/DL latency indication flag set and appended when the relative UL/DL packet delay is higher than or equal to the maximum DL/UL delay difference. In one or more embodiments, the one-way radio ratio user-plane packet delay is a first one-way radio ratio user-plane packet delay, and the method further comprises: determining, with the base station, a second one-way radio ratio user-plane packet delay using the second timestamps; comparing, with the base station, the second one-way radio ratio user-plane packet delay with the minimum one-way radio ratio user-plane latency threshold and the maximum one-way radio ratio user-plane latency threshold; when the second one-way radio ratio user-plane packet delay is higher than the maximum one-way radio ratio user-plane latency threshold, dynamically assigning the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and when the second one-way radio ratio user-plane packet delay is between the maximum one-way radio ratio user-plane latency threshold and the minimum radio ratio user-plane latency threshold, dynamically assigning the cellular mobile device to a different discontinuous reception (DRX) setting than a current DRX setting of the cellular mobile device, thereby reducing the data-transmission latency between the base station and the cellular mobile device.

In one or more embodiments, the base station and the network component are not time-synchronized, and the method further comprises: determining, with the base station, a one-way radio packet delay using the second timestamps, the one-way packet delay defined between the base station and the cellular mobile device; comparing, with the base station, the one-way packet delay with a one-way radio packet delay threshold; when the one-way radio packet delay is higher than the one-way radio packet delay threshold and the maximum RAN latency alert radio-ratio latency indication flag is set, dynamically assigning the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and when the one-way radio packet delay is higher than the one-way radio packet delay threshold and the minimum RAN latency alert radio-ratio latency indication flag is set, dynamically assigning the cellular mobile device to a different discontinuous reception (DRX) setting than a current DRX setting of the cellular mobile device, thereby reducing the data-transmission latency between the base station and the cellular mobile device.

Another aspect of the invention is directed to a communications system comprising: a base station of a cellular wireless network; and a network component of the cellular wireless network. The network component is configured to: determine that a transmission of application data packets through the cellular wireless network between a cellular mobile device and an application server is covered by a local latency policy, the cellular mobile device running an application that is associated with the application server; determine one or more user-plane latency packet delays associated with the application data packets, the one or more user-plane packet delays determined using first timestamps appended to header data of a first data packet, the first data packet sent from the network component to the cellular mobile device via the base station and from the cellular mobile device to the network component via the base station; and when the one or more user-plane packet delays is/are higher than respective one or more user-plane latency thresholds defined in the local latency policy, appending and setting, by the network component, one or more latency alert flags in a header of a second data packet sent from the network component to a base station. The base station is configured to: detect the one or more latency alert flags in the header of the second data packet, the base station in radio communication with the cellular mobile device; and dynamically change one or more radio-framing parameters, in response to the one or more latency alert flags and second timestamps associated with the second data packet, one or more radio-framing parameters to reduce a data-transmission latency between the base station and the cellular mobile device.

In one or more embodiments, the communications system further comprises a user-plane latency manager (UPLM) configured to: store the local latency policy; send the one or more user-plane latency thresholds to the network component and the base station; and cause the base station to dynamically change the one or more radio-framing parameters. In one or more embodiments, the local latency policy defines on-demand service application traffic descriptors including traffic filtering data and/or time window data, and the UPLM is configured to send the on-demand service application traffic descriptors to the network component and the base station.

In one or more embodiments, the one or more user-plane packet delays include a one-way radio ratio user-plane packet delay defined as a ratio of a one-way radio user-plane packet delay with respect to a one-way end-to-end user-plane packet delay, the one-way end-to-end user-plane packet delay defined between the network component and the cellular mobile device, the one-way radio user-plane packet delay defined between the base station and the cellular mobile device, the respective one or more user-plane latency thresholds include a minimum one-way radio ratio user-plane latency threshold, and the one or more latency alert flags include a minimum RAN latency alert radio-ratio latency indication flag, the minimum RAN latency alert radio-ratio latency indication flag set and appended when the one-way radio ratio user-plane packet delay is higher than the minimum one-way radio ratio user-plane latency threshold. In one or more embodiments, the respective one or more user-plane latency thresholds include a maximum one-way radio ratio user-plane latency threshold, the one or more latency alert flags include a maximum RAN latency alert radio-ratio latency indication flag, the maximum RAN latency alert radio-ratio latency indication flag set and appended when the one-way radio ratio user-plane packet delay is higher than the maximum one-way radio ratio user-plane latency threshold, and the minimum RAN latency alert radio-ratio latency indication flag is set and appended when the one-way radio ratio user-plane packet delay is between the minimum one-way radio ratio user-plane latency threshold and the maximum one-way radio ratio user-plane latency threshold.

In one or more embodiments, the base station and the network component are time-synchronized, the one or more user-plane packet delays include a relative UL/DL packet delay that compares a downlink (DL) packet delay from the network component to the base station to an uplink (UL) packet delay from the base station to the network component, the respective one or more user-plane latency thresholds include a maximum DL/UL delay difference between the DL packet delay and the UL packet delay, and the one or more latency alert flags include a RAN latency alert UL/DL latency indication flag, the RAN latency alert UL/DL latency indication flag set and appended when the relative UL/DL packet delay is higher than or equal to the maximum DL/UL delay difference.

In one or more embodiments, the one-way radio ratio user-plane packet delay is a first one-way radio ratio user-plane packet delay, and the base station is further configured to: determine a second one-way radio ratio user-plane packet delay using the second timestamps; compare the second one-way radio ratio user-plane packet delay with the minimum one-way radio ratio user-plane latency threshold and the maximum one-way radio ratio user-plane latency threshold; when the second one-way radio ratio user-plane packet delay is higher than the maximum one-way radio ratio user-plane latency threshold, dynamically assign the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and when the second one-way radio ratio user-plane packet delay is between the maximum one-way radio ratio user-plane latency threshold and the minimum radio ratio user-plane latency threshold, dynamically assign the cellular mobile device to a different discontinuous reception (DRX) setting than a current DRX setting of the cellular mobile device, thereby reducing the data-transmission latency between the base station and the cellular mobile device.

In one or more embodiments, the base station and the network component are not time-synchronized, and the base station is further configured to: determine a one-way radio packet delay using the second timestamps, the one-way packet delay defined between the base station and the cellular mobile device; compare the one-way packet delay with a one-way radio packet delay threshold; when the one-way radio packet delay is higher than the one-way radio packet delay threshold and the maximum RAN latency alert radio-ratio latency indication flag is set, dynamically assign the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and when the one-way radio packet delay is higher than the one-way radio packet delay threshold and the minimum RAN latency alert radio-ratio latency indication flag is set, dynamically assign the cellular mobile device to a different discontinuous reception (DRX) setting than a current DRX setting of the cellular mobile device, thereby reducing the data-transmission latency between the base station and the cellular mobile device.

Another aspect of the invention is directed to one or more non-transitory computer-readable media storing processor-readable instructions that, when executed by a processor, cause the processor to: determine that a transmission of application data packets through the cellular wireless network between a cellular mobile device and an application server is covered by a local latency policy, the cellular mobile device running an application that is associated with the application server; determine one or more user-plane latency packet delays associated with the application data packets, the one or more user-plane packet delays determined using first timestamps appended to header data of a first data packet, the first data packet sent from the network component to the cellular mobile device via the base station and from the cellular mobile device to the network component via the base station; and when the one or more user-plane packet delays is/are higher than respective one or more user-plane latency thresholds defined in the local latency policy, appending and setting, by the network component, one or more latency alert flags in a header of a second data packet sent from the network component to a base station.

BRIEF DESCRIPTION OF THE DRAWINGS

For a fuller understanding of the nature and advantages of the concepts disclosed herein, reference is made to the detailed description of preferred embodiments and the accompanying drawings.

FIG. 10 is a flow chart of a method for dynamic radio framing in a cellular wireless network according to an embodiment.

DETAILED DESCRIPTION

Generally, radio framing is a cellular communication technique used in the time domain to group or package consecutive data transmissions in uplink or downlink. One radio frame length is 10 ms (e.g., in 3G, LTE, 5G new radio (NR)) and divided into 10 subframes with equal duration of 1 ms in LTE and 5G NR. Each subframe carries a well-defined number of data symbols that carry application data. For LTE using normal cyclic prefix this is 14 data symbols per subframe, whereas in 5G NR this can be 14, 28, 56, . . . , 896 (depending on numerology used) data symbols per subframe.

In certain aspects, radio framing is performed by a base station to communicate with a user equipment (UE) in a cell or sector of a wireless network for downlink data transfer. In certain aspects, radio framing is performed by a UE to communicate with a base station in a cell or sector of a wireless network for uplink data transfer. A base station may insert gaps via discontinuous reception (DRX)-mode of operation in downlink during radio framing in order to improve UE battery life. A 5G Node B (i.e., gNB) base station may also assign UEs to different radio framing modes (i.e., numerology) so that more data symbols may be sent in downlink and/or uplink. However, traditionally, these radio framing methods have been applied based on assigned QoS classes (QCI for LTE, 5QI for 5G) for the UEs and there was no possibility to dynamically vary the DRX-mode of operation and/or numerology based on different radio frequency and/or non-radio frequency (e.g., core, backhaul, transport) connectivity conditions.

Aspects of the present disclosure are directed to dynamically reducing the radio contribution of user-plane packet delay of at least one radio frequency antenna associated with a base station and/or cell and/or sector, through dynamic radio framing by selecting and/or altering the DRX-mode and/or numerology mode of a radio frequency antenna associated with a base station in response to user-plane data packet delays occurring between a network component of the wireless network and a UE to reduce data transmission delays and improve user experience.

In an aspect, a system and method for dynamic radio framing based on user-plane latency packet delays at a base station associated with a protocol data unit (PDU) Session Anchor (PSA) user-plane function (UPF) (collectively, a PSA-UPF), a UPF, or another network component is provided.

Figure 1:
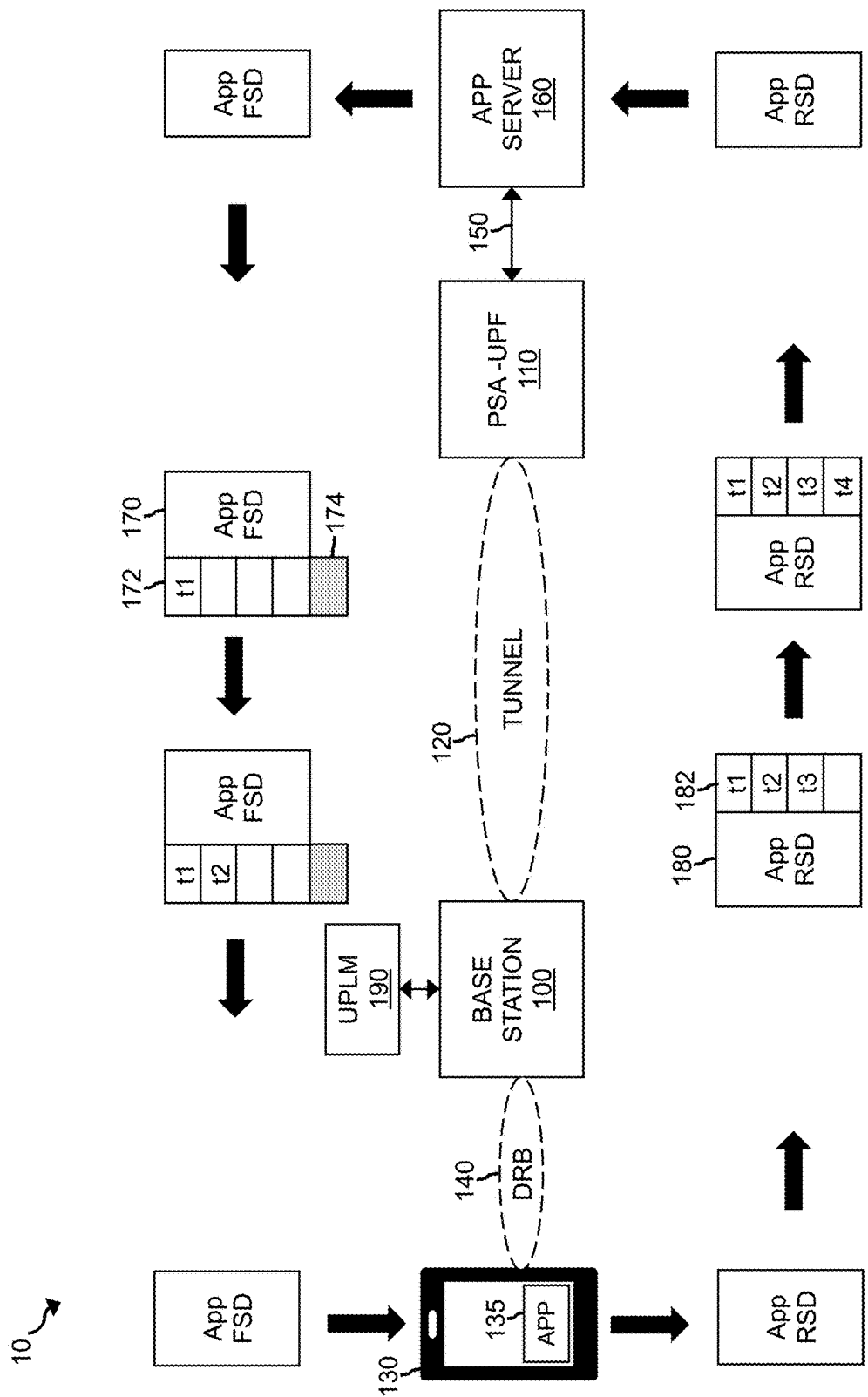
FIG. 1 is a simplified block diagram of a cellular communication network according to an embodiment.

FIG. 1 is a simplified block diagram of a cellular communication network 10 according to an embodiment. The cellular network 10 includes a base station 100, a protocol data unit (PDU) Session Anchor (PSA) user-plane function (UPF) (collectively, PSA-UPF) 110, and a user plane latency manager (UPLM) 190.

The base station 100 and the PSA-UPF 110 are in network communication over a network tunnel 120, such as a 5GS (Fifth Generation System) tunnel, to send and receive data packets. The base station 100 is configured to communicate with the 5G core network. For example, the base station can be or include a 5G Node B (gNB) or an enhanced-LTE NB (ng-eNB). The base station 100 includes or is electrically coupled to one or more cellular antennas that broadcast and receive cellular signals to/from user equipment (UE) 130. Examples of UE 130 include cellular phones (e.g., smartphones), smart watches, cellular-based wireless hot spots, and/or other UE. Data packets for an application 135 running on each UE 130 are sent between the base station 100 and the UE 130 over a data radio bearer (DRB) service link 140.

The UE 130 includes of various units/registers such as one or more microprocessor(s) (e.g., to perform computing tasks), memory (RAM), security (a Universal Subscriber Identity Module (USIM)), a display, one or more speakers, one or more microphones, a touchscreen, a battery, and other components. The application 135 can be stored in computer memory (e.g., a solid-state drive) in the UE. The application can be configured to request on-demand services from the application server 160. The application server 160 can be an over-the-top (OTT) application service provider (ASP) application server (AS).

The PSA-UPF 110 functions as a gateway between the cellular network 10 and one or more data networks 150. The data network(s) 150 provide a communication link between the PSA-UPF 110 and an application server 160 in the cloud (e.g., Internet). The application server 160 corresponds to the application 135 running on the UE 130. As such, the application 135 and the application server 160 can communicate over the cellular network 10, including the DRB 140 and the tunnel 120, and over the data network(s) 150.

The cellular network 10 includes one or more components that is/are configured to monitor the quality of service (QoS) of the cellular network 10. The QoS includes one or more metrics of the network such as its latency. Latency can include several contributions such as packet processing delay, radio scheduling delay, and/or packet transfer delays. The processing delay includes the time that the PSA-UPF 110 and/or the base station 100 and/or the UE 130 needs to process a data packet before forwarding the packet to the next node in the cellular network 10. Radio scheduling delay includes the time that the UE 130 takes to send and/or receive data packets to/from the base station 100 due to the state of the UE 130. For example, the base station 100 can configure the radio resource control (RRC) state of the UE 130 to transition the UE 130 between an RRC_IDLE or an RRC_INACTIVE state where no data is transferred between the UE 130 and the base station 100 and an RRC_CONNECTED state where data can be transferred between the UE 130 and the base station 100. Packet transfer delays due to radio include the time to send a packet over the DRB 140 from the base station 100 to the UE 130 and/or from the UE 130 to the base station 100.

To support extended QoS monitoring, the cellular network 10 is configured to append timestamps to the headers of extended QoS monitoring data packets that are sent through the network. The timestamps of a first extended QoS monitoring data packet are used by the PSA-UPF 110 or another network component, to determine the one-way latency contribution from the core network (e.g., between the PSA-UPF 110 and the base station 100 via the network tunnel 120) and the one-way latency contribution from the radio access network (RAN) (e.g., between the UE 130 and the base station 100 via the DRB 140). When the one-way RAN latency contribution represents a minimum percentage and/or a maximum percentage of the one-way end-to-end latency, the PSA-UPF 110 (or another network component) can set one or more RAN latency alert flag(s) 174 in the header of a second or subsequent extended QoS monitoring data packet. The PSA-UPF 110 can also set a RAN latency alert flag 174 (e.g., when the PSA-UPF 110 and the base station 100 are time-synchronized) that indicates that the downlink core packet delay (from the PSA-UPF 110 to the base station 100) is greater than or equal to the uplink core packet delay (from the base station 100 to the PSA-UPF 110).

The RAN latency alert flag(s) 174 can indicate to the base station 100 that the certain RAN latency measurements have been exceeded relative to certain latency thresholds in a local policy associated with an OTT internet application service provider. The RAN latency alert flag 174 causes the base station 100 to perform one or more additional latency measurements using timestamps in the second QoS monitoring data packet. When the additional latency measurement(s) are higher than respective latency threshold(s), the base station 100 can initiate modifications to the RAN (e.g., at the UE 130). In some embodiments, the RAN latency alert flag(s) 174 can be used to determine the RAN modification (s). The latency thresholds can be configured by the UPLM 190 at the PSA-UPF 110 and/or by the base station 100.

For example, the application server 160 can send an application forward-service data (App FSD) packet 170 to the UE 130 to establish a communication link between (a) the application 135 and (b) the application server 160. The App FSD packet 170 is first sent from the application server 160 to the PSA-UPF 110 over the data network(s) 150. The PSA-UPF 110 appends a first timestamp t1 to the header 172 of the App FSD packet 170 before forwarding the App FSD packet 170 to the base station 100 over the tunnel 120. The base station 100, at reception of the App FSD packet 170, records a second timestamp t2 and the first timestamp t1 stored in the header 172 of the App FSD packet 170, and then forwards the App FSD packet 170 to the UE 130, without timestamps, over the DRB 140 associated with tunnel 120. The data in the App FSD packet 170 is used by the application 135 running on the UE 130. For example, the data in the App FSD packet 170 can be used to establish a communication link between the application 135 and the application server 160. The App FSD packet 170 already includes a header part associated with data communication layer protocols (e.g., some header types are Ethernet, vLAN, IP, UDP, TCP, GTP-U protocols related) used at the application server 160/UE 130 and the data network(s) 150 and tunnel 120 to carry the data between the application server 160 and the UE App. 135.

The UE 130 sends an App return-service data (RSD) packet 180 to the application server 160 in response to the App FSD packet 170. The App RSD packet 180 is first sent to the base station 100 over the DRB 140. The base station 100 appends the repeated first and second timestamps t1 and t2, (which were already recorded from the associated App FSD packet 170) respectively, to the header 182 of the App RSD packet 180. In addition, the base station 100 appends a third timestamp t3 to the header 182 of the App RSD packet 180 before forwarding the App RSD packet 180 to the PSA-UPF 110 over the tunnel 120. The PSA-UPF 110 receives the timestamps t1, t2, t3 and determines a fourth timestamp t4 upon arrival of the App RSD packet 180 and then forwards the App RSD packet 180 to the application server 160 without the extended QoS monitoring data (e.g. timestamps) over the data network(s) 150.

It is noted that in FIG. 1, t2 and t4 shown in the header 172 and the header 182 respectively are shown for convenience; they are recorded values and do not have a slot in the header 172 and the header 182.

The first timestamp t1 represents the time at which the PSA-UPF 110 sends out the App FSD packet 170 to the base station 100. The second timestamp t2 represents the time at which the base station 100 receives the App FSD packet 170 from the PSA-UPF 110. The third timestamp t3 represents the time at which the base station 100 receives the App RSD packet 180 from the UE 130. The fourth timestamp t4 represents the time at which the PSA-UPF 110 receives the App RSD packet 180 from the base station 100. The header 172 of the App FSD packet 170 includes a downlink (DL) sequence number. The header 182 of the App RSD packet 180 includes an uplink (UL) sequence number.

Extended QoS monitoring data comprises the timestamps, the UL/DL sequence numbers (which can be used to determine a first App FSD packet 170 and second App FSD packet 170 or a first App RSD packet 180 and a second App RSD packet 180 and/or to associate a first App RSD packet 180 with a first App FSD packet 170 at the base station 100) and RAN latency alert flag(s) 174 which can be used to determine various extended QoS metrics of the cellular network 10 including the one-way radio access network (RAN) latency, the one-way 5G core user-plane latency, and the one-way end-to-end packet delay. The UPLM 190 can monitor the extended QoS metrics and can cause one or more network parameters (e.g., via the base station 100) to be adjusted to improve the QoS of the cellular network 10. Because the base station 100 has no knowledge of the Subscription Permanent Identifiers (SUPIs) of the UEs 130, the base station 100 can use AN-tunnel info (e.g., gNB-Ipv4/v6 address and gNB N3 side TEID) of tunnel 120 to reach UE context information to apply the changes.

In summary, FIG. 1 shows a system and method for extended QoS monitoring and dynamic reduction of an end-to-end packet delay in a mobile communication system. The packet delay between UE 130 and PSA-UPF 110 is the combination of the RAN part of uplink (UL)/downlink (DL) packet delay (e.g. the delay associated with transmitting packets over the DRB 140 from the base station 100 to the UE 130 (DL) and from the UE 130 to the base station 100 (UL)) and UL/DL packet delay between the base station 100 (e.g., a new radio (NR) base station (e.g., a 5G base station) or a next-generation (NG)-RAN (e.g., gNB (5G Node B) for non-split scenario for convenience as shown in FIG. 1) and PSA-UPF 110. The base station 100 provides the extended QoS Monitoring on the RAN part of UL/DL packet delay measurement. The extended QoS Monitoring on UL/DL packet delay between the base station 100 and the PSA-UPF 110 can be performed on different levels of granularities, e.g., per QoS Flow per UE level, or per GTP-U (Generic/GPRS Tunneling Protocol for user plane) path level.

In other embodiments, the extended QoS can include additional timestamps when there are multiple UPFs between the base station 100 and the PSA-UPF 110.

If the thresholds of one or more extended QoS latency metrics is/are exceeded, the UPLM 190 and/or the base station 100 can modify the network configuration based on the degree of exceeding the threshold(s) and the state of the one or more RAN latency alert flag(s) 174 and/or one or more previous network configuration settings stored associated with one or more user packet delay measurements (e.g., latency measurements as illustrated in Table 5). Additional tables having precalculated and/or pre-experienced (lab tests, field tests etc.) user-plane delay values per network configuration settings (e.g., per numerology index selection, as discussed below) may be used during analysis.

Figure 2:
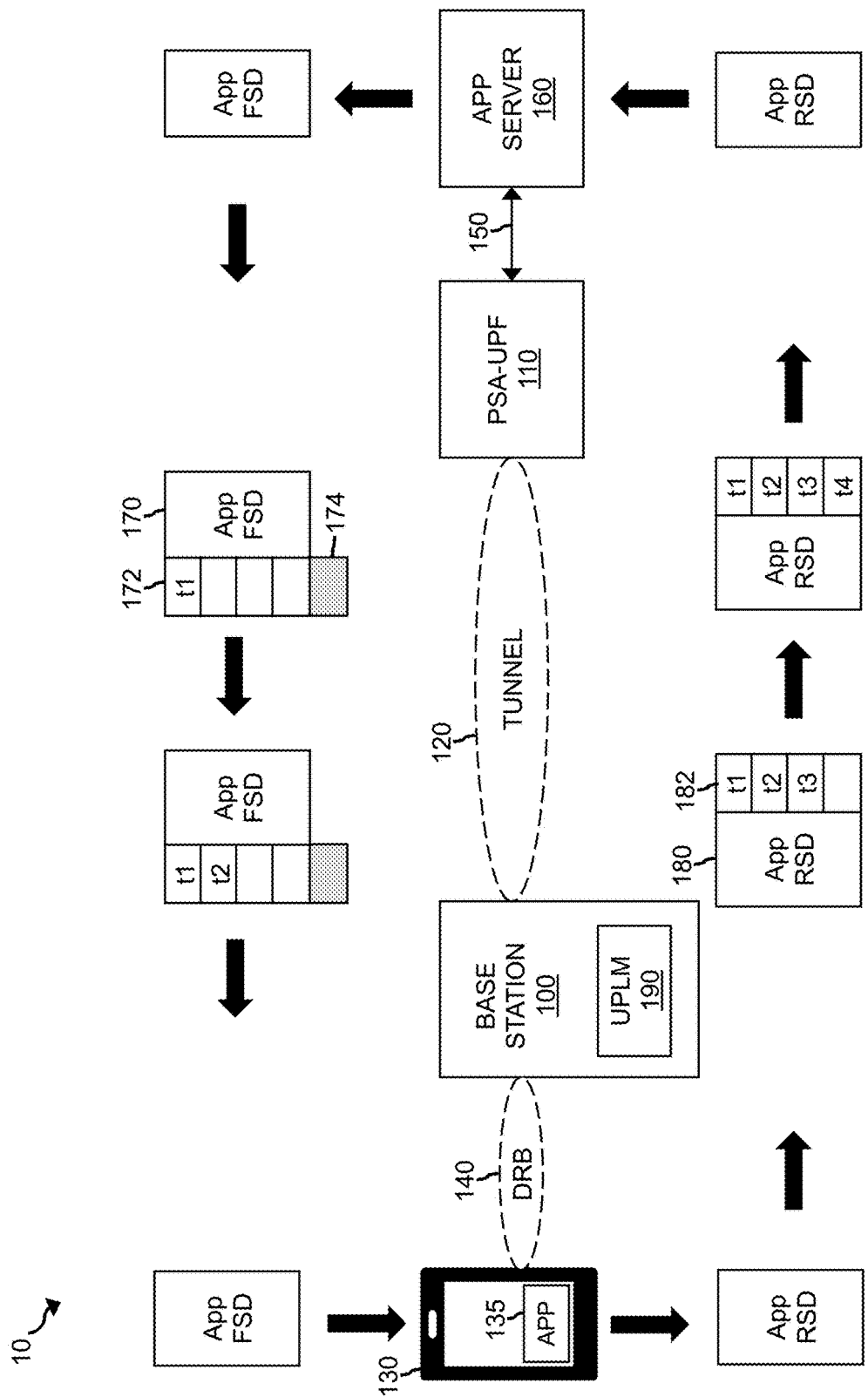
FIG. 2 is a simplified block diagram of a cellular communication network according to another embodiment.
Figure 3:
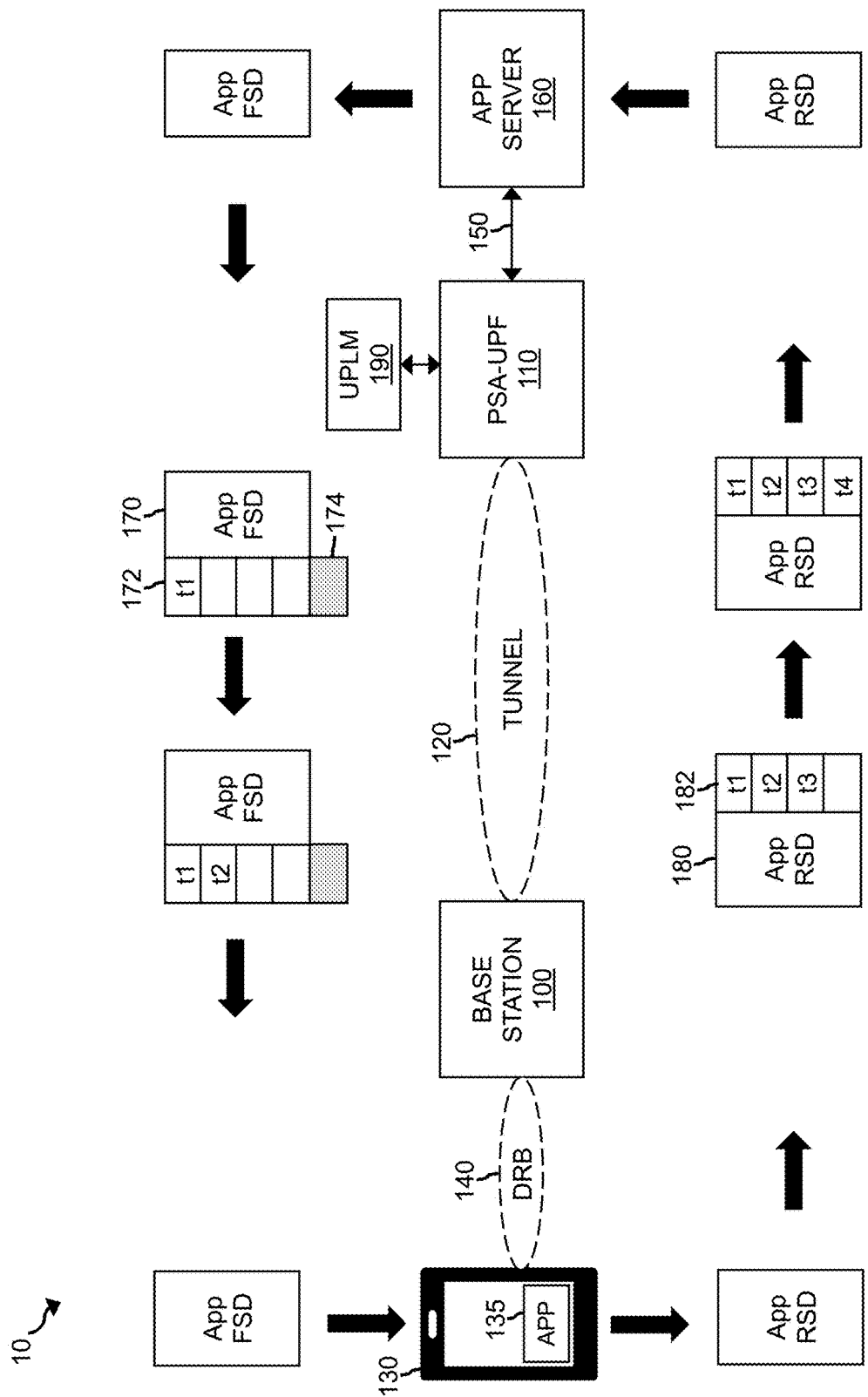
FIG. 3 is a simplified block diagram of a cellular communication network according to another embodiment.
Figure 4:
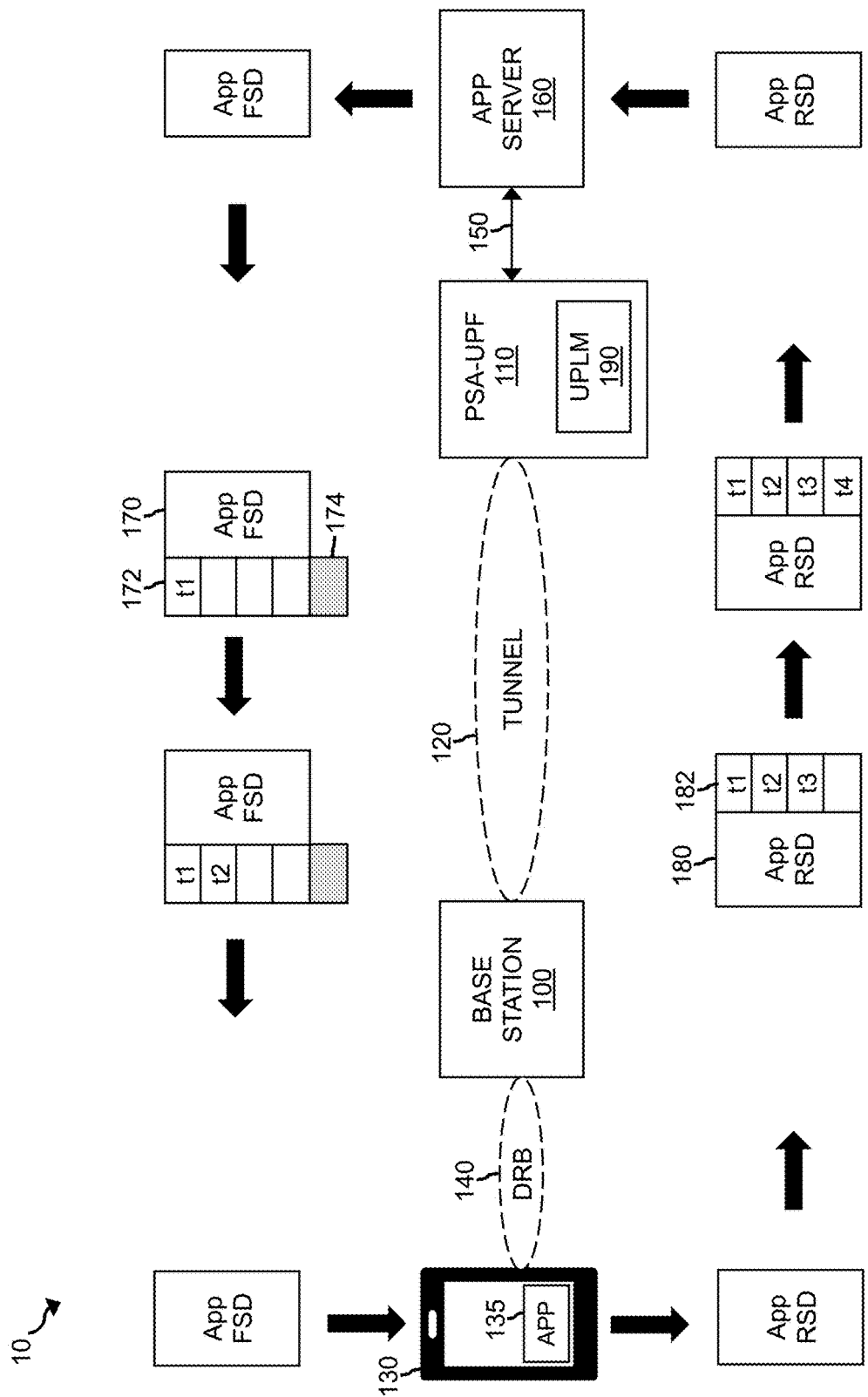
FIG. 4 is a simplified block diagram of a cellular communication network according to another embodiment.

The UPLM 190 is in network communication with the base station 100. Alternatively, the UPLM 190 can be located within and/or included in the base station 100, for example as illustrated in FIG. 2. In another embodiment, the UPLM 190 is in network communication with the PSA-UPF 110, as illustrated in FIG. 3. Alternatively, the UPLM 190 can be located within and/or included in the PSA-UPF 110, as illustrated in FIG. 4. In each embodiment, the UPLM 190 is in network communication with the base station 100 and with the PSA-UPF 110.

The UPLM 190 can be configured to select and/or change orthogonal frequency division multiplexing (OFDM) numerology and/or DRX settings of the base station 100 and/or UE 130. The OFDM numerology settings include new radio (NR) subcarrier spacing (SCS) settings and/or NR cyclic prefix (CP) component settings.

The UPLM 190 can be configured to select and/or change OFDM numerology settings and/or DRX settings of a UE (e.g., UE 130) served by a base station (e.g., base station 100) having an associated 5GS tunnel (e.g., tunnel 120). For example, the UPLM 190 can send a radio-framing signal to the base station 100 to implement dynamic radio framing with respect to the base station 100 and the UEs (e.g., UE 130) that are communicating using applications (e.g., application 135) that are covered by a local reduced-latency policy associated with an OTT internet application service provider (OTT-IASP) in which extended QoS monitoring is performed. The base station 100 can use either an RRC-based adaption or a downlink control information (DCI)-based adaption. The RRC adaption can include sending one or more standard RRC signaling messages from the base station 100 to the UE 130 to modify the DRX settings of the UE 130. Example standard RRC signaling messages include an RRC Reconfiguration Message to modify the DRX settings. The DCI adaption can include DCI signaling using standard PDCCH (Physical Downlink Control Channel) messages from the base station 100 to the UE 130 to modify the OFDM numerology settings of the UE 130. Example standard PDCCH messages include UE-specific (bandwidth part) BWP activation messages (e.g., activation of a specific BWP with a specific numerology out of a maximum of 4 BWPs in DL (downlink) and/or in UL (uplink) per UE already configured in UE by the base station).

The UPLM 190 may include different units implemented on a software component and/or software and a hardware component. The hardware component can include one or more microprocessors with associated central processing units (CPUs) and random-access memory (RAM) configuration.

The base station 100 may comprise at least one general purpose processor (GPP) responsible for, among others, radio-control functions that controls communication and behavior between one or more UEs 130 and the base station 100. The base station 100 may also comprise at least one GPP responsible for, among others, user-plane packet processing which terminates an interface from 5G core such as extracting IP packets amongst data packets received. Data packets may include extended QoS monitoring data which is preferably not sent to the UE 130.

The base station 100 may then add/remove (for downlink and uplink respectively) various radio-frequency-specific headers to received IP packets such as SDAP (Service Data Adaptation Protocol), PDCP (Packet Data Convergence Protocol), RLC (Radio Link Control), MAC (Medium Access Control) headers. Specific for NR, SDAP configuration (via RRC signaling with messages like RRC Setup or RRC Reconfiguration) may be used for QoS Flow to/from DRB mapping for uplink and downlink.

The base station further may include one or more baseband processors comprising one or more digital signal processing units which apply(ies) (among other things) physical-layer (L1) operations such as numerology, coding, rate matching, and modulation which converts IP packet data to one or more OFDM radio symbols with cyclic prefix where a partial repetition of the OFDM radio symbol is prefixed to overcome multipath effects. These OFDM radio symbols may then be sent to/received from a radio frequency front end which comprises (but not limited to) analog to/from digital converter, a transceiver, a power/low noise amplifier, one or more filters that is/are connected to one or more antennas and/or antenna elements associated with the base station 100.

For both uplink and downlink, OFDM radio symbols (which may carry user plane data or control information between UE 130 and base station 100) are transmitted on a time-frequency grid where time comprises one or more slots within a subframe (which is within a frame) and frequency comprises one or more subcarriers.

Figure 5:
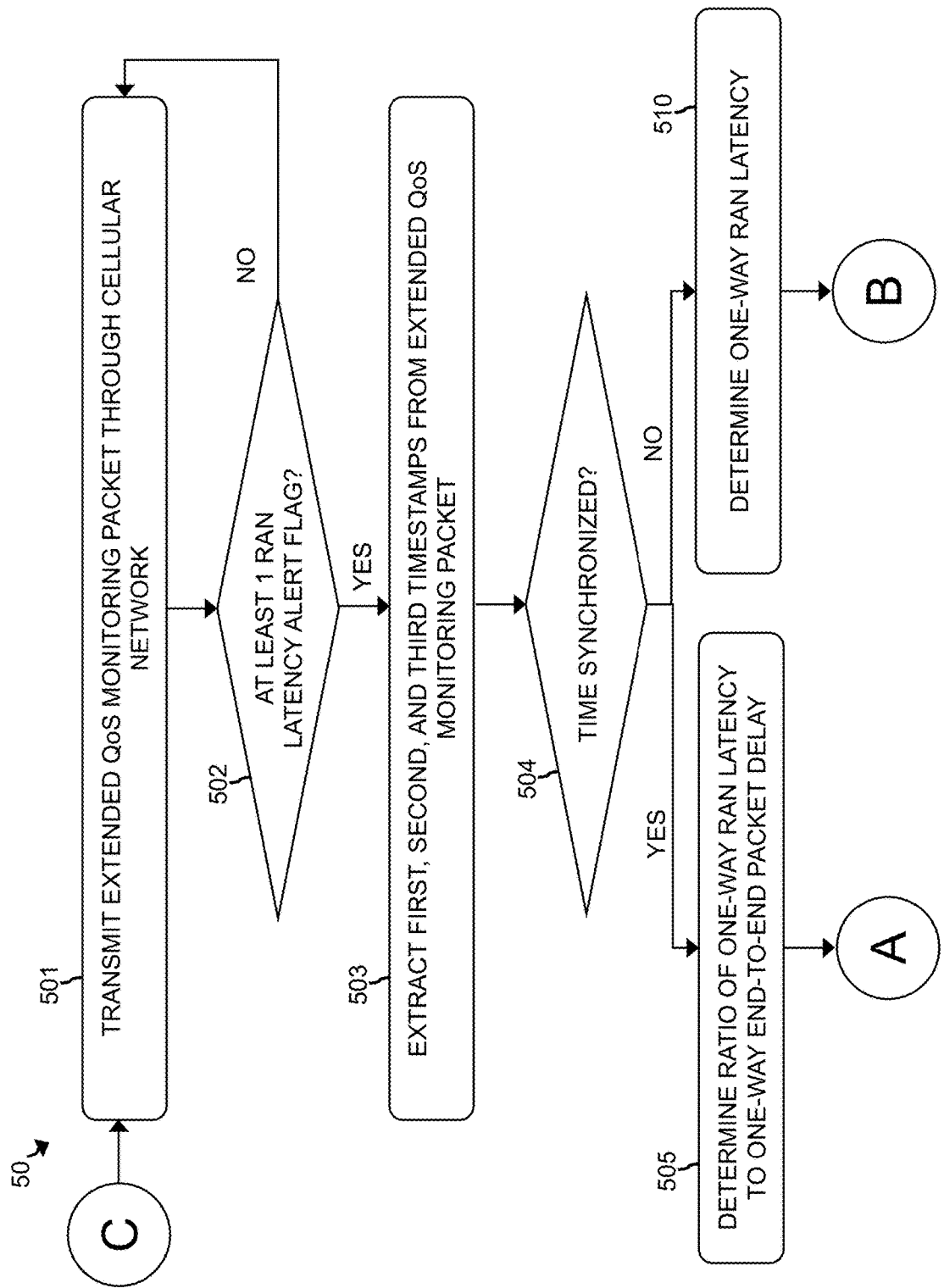
FIG. 5 is a flow chart of a method for dynamically configuring a cellular network to improve radio access network latency contributions to the network quality of service according to an embodiment.
Figure 5:
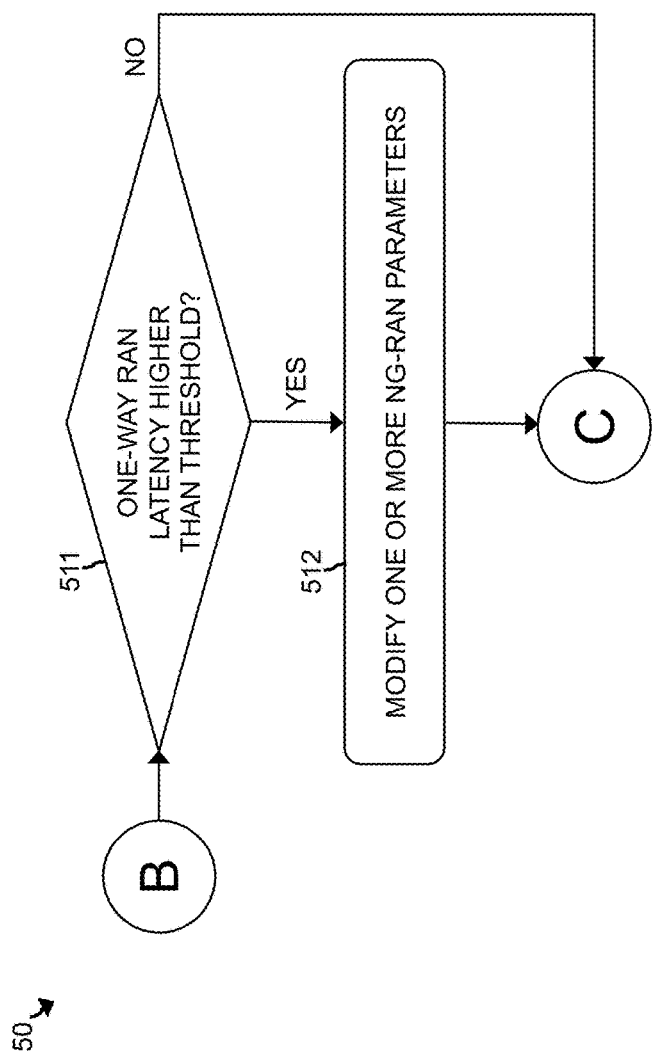

FIG. 5 is a flow chart of a method 50 for dynamically configuring a cellular network to reduce RAN latency contributions to the network QoS according to an embodiment. Method 50 can be performed using cellular network 10 including UPLM 190.

In step 501, extended QoS monitoring data packets are sent through the cellular wireless network. The extended QoS monitoring data packet can comprise App FSD packets 170 and/or App RSD packets 180.

In step 502, the state of one or more RAN latency alert flags (e.g., RAN latency alert flag 174) in the header of an extended QoS monitoring data packet is determined. The state of the RAN latency alert flag(s) can be determined by base station 100.

The RAN latency alert flag(s) can include a RAN Latency Alert Minimum Radio-ratio Latency Indication, a RAN Latency Alert Maximum Radio-ratio Latency Indication, and/or a RAN Latency Alert UL/DL Latency Indication. The RAN Latency Alert Minimum Radio-ratio Latency Indication can indicate the presence of a RAN latency alert for a minimum radio-ratio latency contribution condition. The RAN Latency Alert Maximum Radio-ratio Latency Indication can indicate the presence of a RAN latency alert for a maximum radio-ratio latency contribution condition. The RAN Latency Alert UL/DL Latency Indication can indicate the presence of a RAN latency alert in which the DL (PSA-UPF 110 to base station 100 (NG-RAN) latency contribution is higher than or equal to the UL (base station 100 (NG-RAN) to PSA-UPF 110) latency contribution. Each RAN latency alert flag can be represented as one bit in which a value of 0 corresponds to no alert and a value of 1 corresponds to an alert or a flag.

If no RAN latency alert flags are set (e.g., all values are 0), the method 50 returns to step 501. If at least one RAN latency alert flags is set (e.g., at least one value is 1), the method 50 proceeds to step 503.

In step 503, the first, second, and third timestamps t1, t2, and t3, are extracted from the extended QoS monitoring data packet. The timestamps can be extracted by the base station 100.

In step 504, it is determined whether the base station and the network components are time-synchronized. The base station and the network components are time-synchronized when the difference between their internal times is less than or equal to a predetermined maximum value (e.g., 4 ms) with respect to each other and/or with respect to a common standard time reference source such as GNSS (Global Navigation Satellite System).

If the base station and the network components are time synchronized, the method 50 proceeds to step 505. If not, the method 50 proceeds to step 510.

In step 505, the ratio of the one-way RAN latency contribution to the one-way end-to-end packet delay is determined. Step 505 can be performed by the base station 100 and/or by the UPLM 190.

The one-way end-to-end packet delay (A) is the sum of the one-way delay 5G core user-plane latency contribution (B) and the one-way 5G RAN latency contribution (C). In other words:

$$A = B + C \quad (1)$$

where:

$$B = t2 - t1 \quad (2)$$

and $$C = \frac{t3 - t2}{2} \quad (3)$$

The one-way end-to-end packet delay can be determined by the base station 100 and/or the UPLM 190.

The ratio (D) of the one-way RAN latency contribution (C) to the one-way end-to-end packet delay (A) is determined according to Equation 4. The one-way RAN latency contribution in Equation 3 is expressed as half of the round-trip time (t3-t2) of the data packet to travel from the base station to the UE and then its response back to the base station. Thus, the one-way RAN latency contribution is an averaged one-way RAN latency contribution.

$$D = \frac{C}{A} = \frac{C}{B+C} \quad (4)$$

In some embodiments, step 505 can optionally include determining whether the one-way end-to-end packet delay (A) is higher than a one-way end-to-end delay threshold (E2E threshold). The E2E threshold can be in the range of about 80 ms to about 120 ms including about 90 ms, about 100 ms, about 110 ms, and any value or range between any two of the foregoing values. If the one-way end-to-end packet delay is higher than the E2E threshold in this optional embodiment, the method 50 can proceed to step 506. If the one-way end-to-end packet delay is lower than or equal to the E2E threshold in this optional embodiment, the method 50 can return to step 501.

In step 506 (via placeholder A), it is determined whether the ratio (D) of the one-way RAN latency contribution (C) to the one-way end-to-end packet delay (A) (the RAN-E2E ratio for short), determined in step 505, is higher than a minimum ratio threshold. The minimum ratio threshold can be in the range of about 0.4 to about 0.6 including about 0.45, about 0.5, about 0.55, and any value or range between any two of the foregoing values. If the RAN-E2E ratio is higher than the minimum ratio threshold, the method 50 proceeds to step 507. If the RAN-E2E ratio is lower than or equal to the minimum threshold, the method 50 returns to step 501 (via placeholder C). Step 506 can be performed by the base station 100 and/or the UPLM 190.

In step 507, it is determined whether the RAN-E2E ratio is higher than a maximum ratio threshold. The maximum ratio threshold can be about 0.6 to about 0.8 including about 0.65, about 0.7, about 0.75, and any value or range between any two of the foregoing values. If the RAN-E2E ratio is higher than the maximum ratio threshold, the method 50 proceeds to step 508. If the RAN-E2E ratio is lower than or equal to the maximum ratio threshold, the method 50 proceeds to step 509. Step 507 can be performed by the base station 100 and/or the UPLM 190.

In step 508, the UE 130 is assigned a higher OFDM numerology setting than the current OFDM numerology setting of the UE 130. Step 508 can be performed by the base station 100. In one example, the UPLM 190 can cause the base station 100 to adjust the OFDM numerology settings for the UE 130.

OFDM numerology settings (μ) includes subcarrier spacing (SCS also known as Δf) and cyclic prefix (CP) configuration parameters. OFDM numerology applies to uplink, downlink, and sidelink communications. In new radio (e.g., 5G), for a user device (e.g., UE 130) to support multiple OFDM numerologies, the subcarrier spacing configuration and the corresponding cyclic prefix (CP) parameters are sent from the base station 100 to UE 130 with higher-layer signaling (so called "RRC signaling"). Uplink and downlink transmissions are structured in the time domain as "radio frames" where the duration of each frame is 10 ms. Each frame has ten subframes and each subframe has a 1 ms duration. Each subframe includes one or more slots where the slot count depends on the OFDM numerology setting. Each slot carries either 14 or 12 OFDM symbols for the normal cyclic prefix and the extended cyclic prefix settings, respectively.

Each OFDM symbol carries a portion of data exchanged between the UE 130 and the base station 100. The number of OFDM symbols packed together during a time interval, known as a scheduling transmission time interval, where the exact duration is defined by the slot duration which depends on the OFDM numerology setting. A higher numerology setting (e.g., larger SCS and/or extended (or higher) CP with fewer symbols per slot) results in a shorter slot duration in time which may be used to support user-plane packet data transfer in a lower latency between the UE 130 and the base station 100 compared to the case when no increase in numerology index was applied.

Table 1 provides the supported OFDM numerology settings for 5G cellular communications. The OFDM numerology (μ) settings are integers ranging from 0 to 6. Each OFDM numerology setting has a corresponding subcarrier spacing (SCS), one or more corresponding cyclic prefix settings, a corresponding slot duration, and a one-way RAN latency contribution (C) value. The one-way RAN latency contribution C value represents a theoretical gain measure in the user-plane delay reduction contribution associated with reduced slot duration. For example switch from μ-0 TO μ-1 results in a theoretical gain of 128/64=2. The SCS=60 has 2 possible cyclic prefix settings (normal or extended). All other subcarrier spacing settings have only 1 possible cyclic prefix setting (normal).

TABLE 1

| μ | SCS (kHz) | Cyclic prefix | Slot Duration (ms) | Comparative measure C value |
|---|---|---|---|---|
| 0 | 15 | Normal | 1 | 128 |
| 1 | 30 | Normal | 0.5 | 64 |
| 2 | 60 | Normal, Extended | 0.25 | 32 |
| 3 | 120 | Normal | 0.125 | 16 |
| 4 | 240 | Normal | 0.0625 | 8 |
| 5 | 480 | Normal | 0.03125 | 4 |
| 6 | 960 | Normal | 0.015625 | 2 |

Table 2 provides the number of OFDM symbols per slot, the number of slots per frame, and the number of slots per subframe for each subcarrier spacing (μ) when the cyclic prefix setting is normal.

TABLE 2

| μ | Symbols/Slot ($N_{symb}^{slot}$) | Slots/Frame ($N_{slot}^{frame,\mu}$) | Slots/Subframe ($N_{slot}^{subframe,\mu}$) |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |
| 6 | 14 | 640 | 64 |

Table 3 provides the number of OFDM symbols per slot, the number of slots per frame, and the number of slots per subframe for each subcarrier spacing (μ) when the cyclic prefix setting is extended.

TABLE 3

| μ | Symbols/Slot ($N_{symb}^{slot}$) | Slots/Frame ($N_{slot}^{frame,\mu}$) | Slots/Subframe ($N_{slot}^{subframe,\mu}$) |
| --- | --- | --- | --- |
| 2 | 12 | 40 | 4 |

Figure 6:
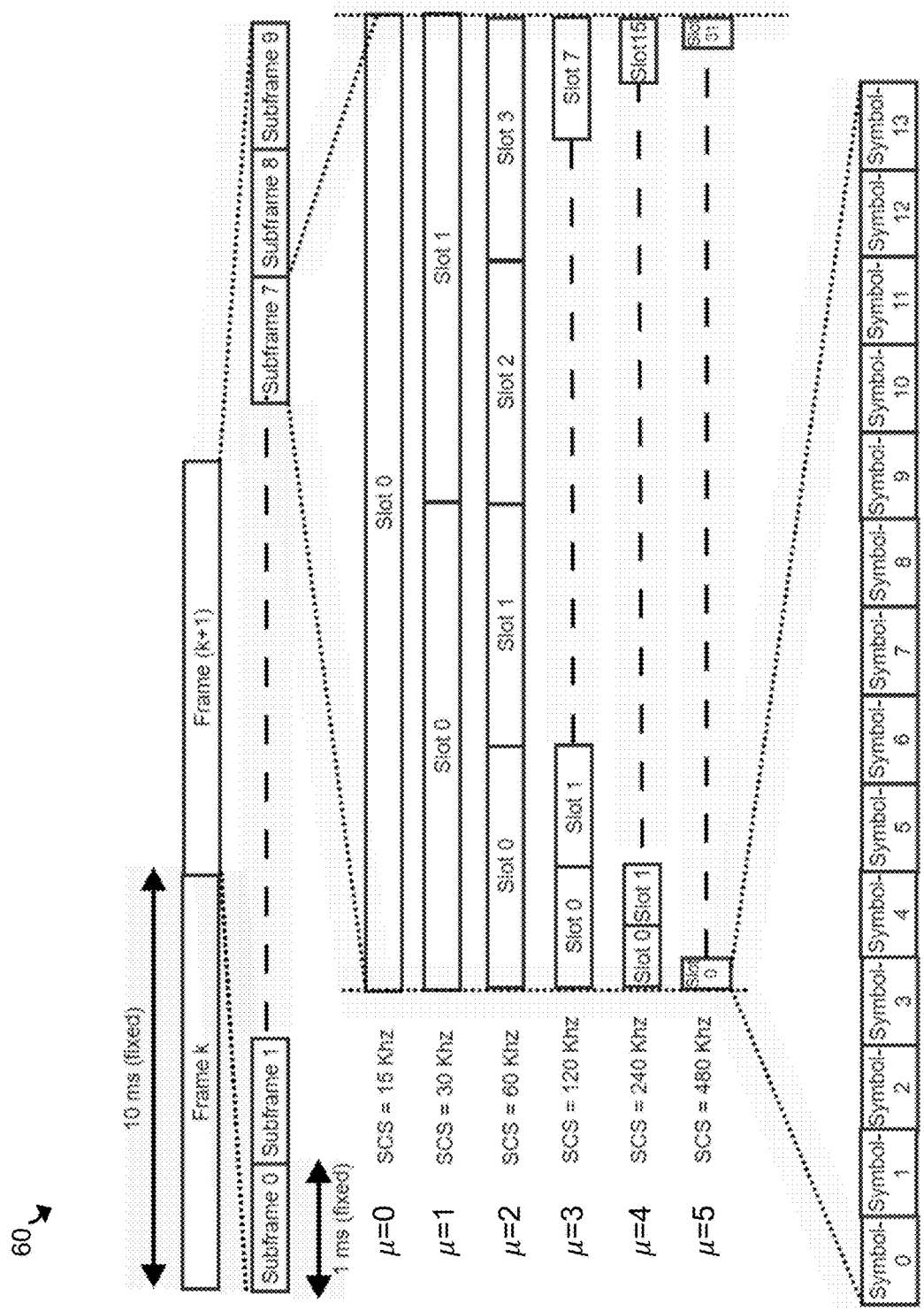
FIG. 6 graphically illustrates a time-domain of subcarrier slot configurations in the time domain.

FIG. 6 graphically illustrates a time-domain plot 60 of subcarrier slot configurations in the time domain for the subcarrier spacing settings 0-5 including the number of slots and the number of symbols per slot. Subcarrier spacing setting 6 is not illustrated in plot 60 due to the large space needed to illustrate this setting. In addition, the extended cyclic prefix setting (12 symbols/slot) is not illustrated in plot 60 for clarity purposes.

After a higher OFDM numerology setting is assigned in step 508, the method 50 returns to step 501 (via placeholder C).

If it is determined in step 507 that the RAN-E2E ratio is lower than or equal to the minimum ratio threshold, the method 50 proceeds to step 509 where the UE 130 is assigned a different discontinuous reception (DRX) setting than the current DRX setting of the UE 130 to reduce user-plane latency between the UE and the base station. For example, step 509 can include increasing a DRX active time parameter and/or reducing a DRX cycle parameter. Step 509 can be performed by the base station 100. In one example, the UPLM 190 can cause the base station 100 to adjust the DRX cycle parameter settings for the UE 130.

DRX is a base station-controlled UE power management technique to turn off the UE receiver during data inactivity periods to extend UE battery life which increases latency to transmit or receive data due to reduced possibilities for downlink scheduling. UEs can be configured by the base station with various DRX sleep (offDuration) and wake-up (onDuration) cycles depending on RRC state. (e.g., RRC_IDLE and RRC_INACTIVE state with no data transfer in uplink or downlink; RRC_CONNECTED state with data transfer and/or data in buffer of base station or UE waiting to be sent for uplink and/or downlink).

DRX parameters for UEs in the RRC_CONNECTED state (e.g., Connected Mode DRX (CM-DRX)) may be configured so that power savings are achieved. If CM-DRX is not configured, the UE monitors the PDCCH (a physical downlink control channel primarily used to carry scheduling information (e.g., frequency and time resource assignments for uplink and downlink data and control information) to a UE for an upcoming data transmission) every subframe (e.g., every 1 ms) to check if there is a notification for the UE to get data from the base station (in the downlink direction). This frequent monitoring of the PDCCH reduces the energy efficiency of the UE's battery.

If CM-DRX is configured in the gNB and signaled to the UE, the UE periodically enters a sleeping mode or state during which the UE does not monitor the PDCCH. When data transmission is required in the downlink direction, the UE monitors the PDCCH only during an allowed periodic wake-up duration. For retransmission needs, the UE may be configured with additional occasional wake-up periods to monitor the PDCCH.

CM-DRX mode of operation may increase user-plane latency for an ongoing application session of a UE. For example, downlink data may arrive at the base station when UE is in the CM-DRX Sleep (OffDuration) state such that the base station (e.g., gNB) needs to wait to send the downlink data to the UE until the DRX cycle (long and/or short) ends. A similar case applies for uplink where a UE in CM-DRX mode will transmit uplink data (e.g., network related signaling data such as CSI (Channel State Information) indicators of radio quality and so on) and SRS (Sounding Reference Signal) which is sent from the UE to base station) only during onDuration periods. When a UE has some application-related data to send to the base station in uplink, the UE can access the network regardless the UE's DRX state such that uplink is not affected by DRX methods.

Thus, the longer the DRX cycle (long and/or short) length (e.g. in ms), the higher the latency introduced for communication between the UE and the base station (e.g., gNB), the more energy efficiency in UE battery is achieved.

Example DRX-related parameters include DRX-onDurationTimer (specifies amount of time in ms or sub-ms starting from the beginning of each DRX cycle (ShortCycle or LongCycle), for the UE to decode the PDCCH or to be awake), DRX-InactivityTimer (specifies amount of time in ms for the UE to be awake after a data transmission in uplink (UL—from UE to base station (e.g., gNB)) and/or downlink (DL—from base station (e.g., gNB) to UE)), HARQ (Hybrid Automatic Repeat Request) and Retransmission-related timers for uplink and downlink (used to enable UE to be awake during the time of re-transmission while reducing the possibility of missing retransmission occasions in uplink or downlink), DRX-ShortCycle (specifies 0 or DRX-ShortCycleTimer count of consecutive short cycles in ms in which UE is awake for the duration of DRX-onDurationTimer at the beginning of each cycle), DRX-LongCycle (specifies continuous number of long cycles in ms in which the UE is awake for the consecutive duration set by DRX-onDurationTimer at the beginning of each cycle). Amongst these parameters, the active time for a UE may be defined for the duration that the UE monitors the PDCCH. One or more of these parameters are DRX active time parameters: DRX-onDurationTimer, DRX-InactivityTimer, DRX-RetransmissionTimerDL and/or DRX-RetransmissionTimerUL.

The longer the DRX active time parameters are, the shorter latency increase occurs between the UE 130 and the base station 100 (e.g., gNB) due to DRX operation. In addition, the shorter the DRX cycle parameters (DRX-LongCycle and/or DRX-ShortCycle) are, the shorter latency increase occurs between the UE 130 and the base station 100 (e.g., gNB) due to DRX operation. The DRX cycle parameters determines the length of UE inactivity until the UE becomes active to monitor the PDCCH. Another way to reduce user-plane latency due to DRX operation is to turn off/disable/deactivate DRX for the UE by the base station.

Figure 7:
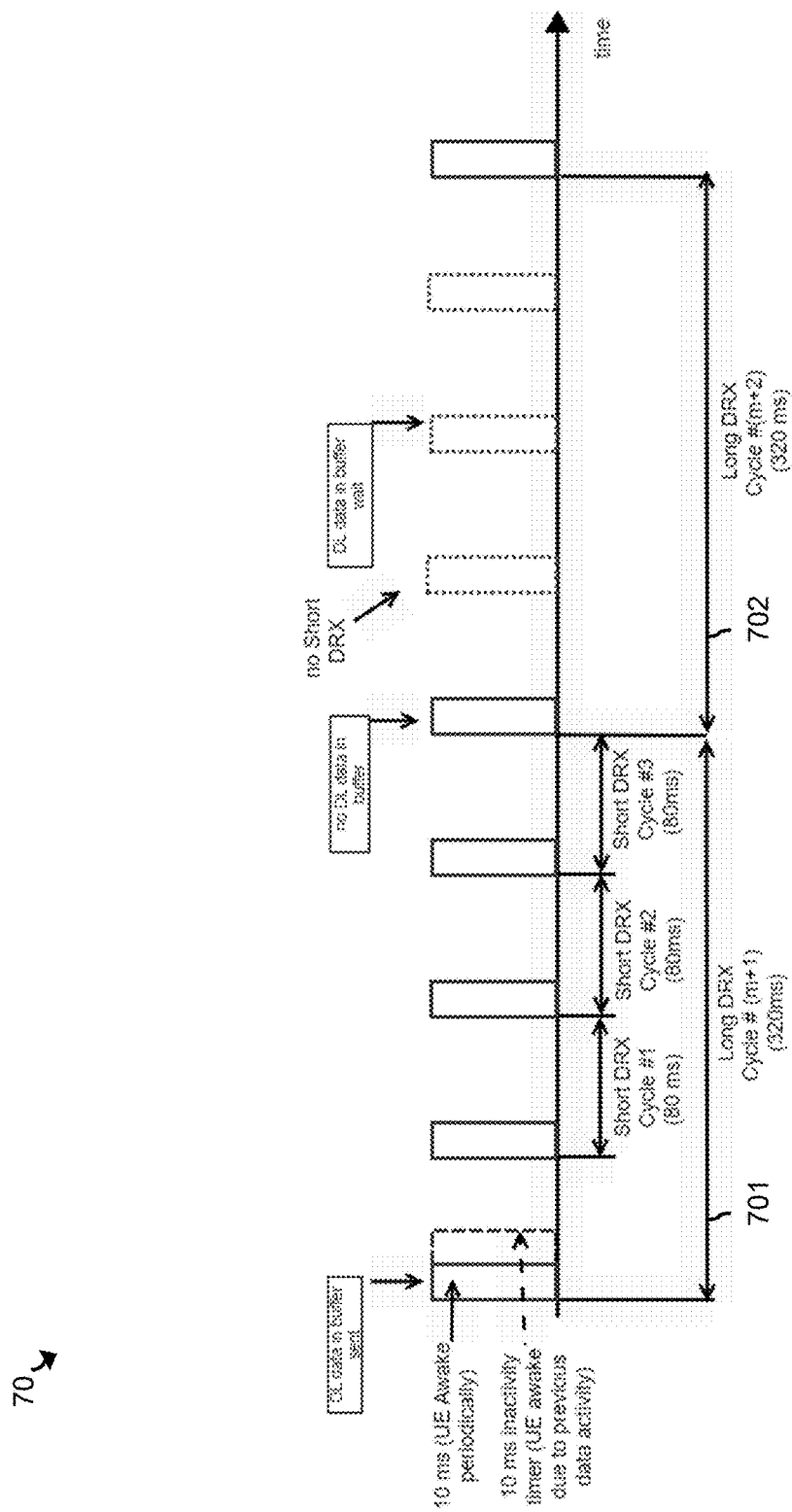
FIG. 7 is an example timing diagram of an example connected-mode discontinuous reception setting for a user equipment contributing to user-plane latency.

FIG. 7 is an example timing diagram 70 of an example connected-mode DRX setting for a UE contributing to user-plane latency. In this representation, downlink data for the UE arrives to gNB buffer within 10 ms of the beginning of a first long DRX cycle 701 window which automatically expands (i.e., for DRX-ShortCycleTimer=3, the UE awake periods DRX-ShortCycle=80 ms apart). At the beginning of the second long DRX cycle 702, no data for the UE exists in the buffer to send in downlink thus, and the Short DRX is not activated until the end of long DRX cycle which is 320 ms. This means UE has to wait 320 ms even if there is data addressed for her/him in the buffer of the base station. (e.g., gNB). As a result, when short DRX is active, at most 80 ms gaps exists in radio transmission due to DRX whereas if short DRX is not active, then at most 320 ms gaps occur in worst scenario due to DRX operation.

The timing diagram 70 is based on the following DRX parameter settings: DRX-onDurationTimer (10 ms), DRX-InactivityTimer (10 ms), DRX-ShortCycle (80 ms), DRX-ShortCycleTimer (3), DRX-LongCycle (320 ms), DRX-RetransmissionTimerDL (not shown), DRX-RetransmissionTimerUL (not shown) According to 3GPP specifications, long DRX cycle length must be an integer multiple of short DRX cycle length.

In some embodiments, step 509 can include increasing a DRX index number for the UE, where each DRX index number includes a set of predefined DRX settings. Example DRX indices are provided in Table 4. DRX index 1 results in a relatively high user-plane latency between the UE and base station (e.g., a high one-way RAN latency contribution C value). DRX index 1 can alternately be referred to as a high-C DRX index. DRX index 2 results in a medium user-plane latency between the UE and base station (e.g., a medium one-way RAN latency contribution C value). DRX index 2 can alternately be referred to as a medium-C DRX index. DRX index 3 results in a low user-plane latency between the UE and base station (e.g., a low one-way RAN latency contribution C value). By increasing the DRX index setting for the UE, the user-plane latency between the UE and base station can be decreased/lowered. DRX index 3 can alternately be referred to as a low-C DRX index.

TABLE 4

| DRX Setting | DRX Index 1 | DRX Index 2 | DRX Index 3 | Range of Possible Values |
| --- | --- | --- | --- | --- |
| DRX Configured | Yes | Yes | No | n/a |
| DRX-LongCycle | 320 ms | 40 ms | n/a | 10 ms-10,240 ms |
| DRX-ShortCycle | 80 ms | 10 ms | n/a | 2 ms-640 ms |
| DRX-onDuration Timer | 10 ms | 16 ms | n/a | 1 ms-1,600 ms |
| DRX-Inactivity Timer | 10 ms | 16 ms | n/a | 0 ms-2,560 ms |
| DRX-Retransmission-TimerDL | 8 ms | 12 ms | n/a | 0 ms-320 ms |
| DRX-Retransmission-TimerUL | 8 ms | 12 ms | n/a | 0 ms-320 ms |

When the base station and the network components are not time synchronized, the method 50 proceeds from step 504 to 510. In step 510, the one-way RAN latency contribution (C) is determined according to Equation 3. Step 510 can be performed by the base station 100 and/or the UPLM 190.

In step 511 (via placeholder B), it is determined whether the one-way RAN latency contribution is higher than a threshold RAN latency contribution. The threshold RAN latency contribution can be about 30 ms to about 95 ms including about 35 ms, about 45 ms, about 55 ms, about 65 ms, about 75 ms, about 85 ms and any value or range between any two of the foregoing values.

If the one-way RAN latency contribution is higher than a threshold RAN latency contribution, the method proceeds to step 512 where one or more NG-RAN parameters are modified. If the one-way RAN latency contribution is less than or equal to the threshold RAN latency contribution, the method 50 returns to step 501 via placeholder C.

The NG-RAN parameter(s) modified in step 512 include the OFDM numerology settings and/or the DRX settings of the UE 130. The NG-RAN parameters modified can be based, at least in part, on the RAN latency alert flag received in step 502. For example, if the RAN latency alert indicates that the RAN-E2E ratio is higher a minimum ratio threshold (and lower a maximum ratio threshold), one or more DRX settings can be modified as described in step 509. In another example, if the RAN latency alert indicates that the RAN-E2E ratio is higher a maximum ratio threshold, a higher OFDM numerology setting can be assigned as described in step 508. It is noted that in the not-time-synchronized case, the RAN latency alert flag(s) received in step 502 do not include a RAN Latency Alert UL/DL Latency Indication due to the potential mismatch in timestamps, and thus the NG-RAN parameters modified in step 512 are not modified based on the RAN Latency Alert UL/DL Latency Indication flag.

After the NG-RAN parameter(s) are modified in step 512, the method 50 returns to step 501 (via placeholder C).

Figure 8:
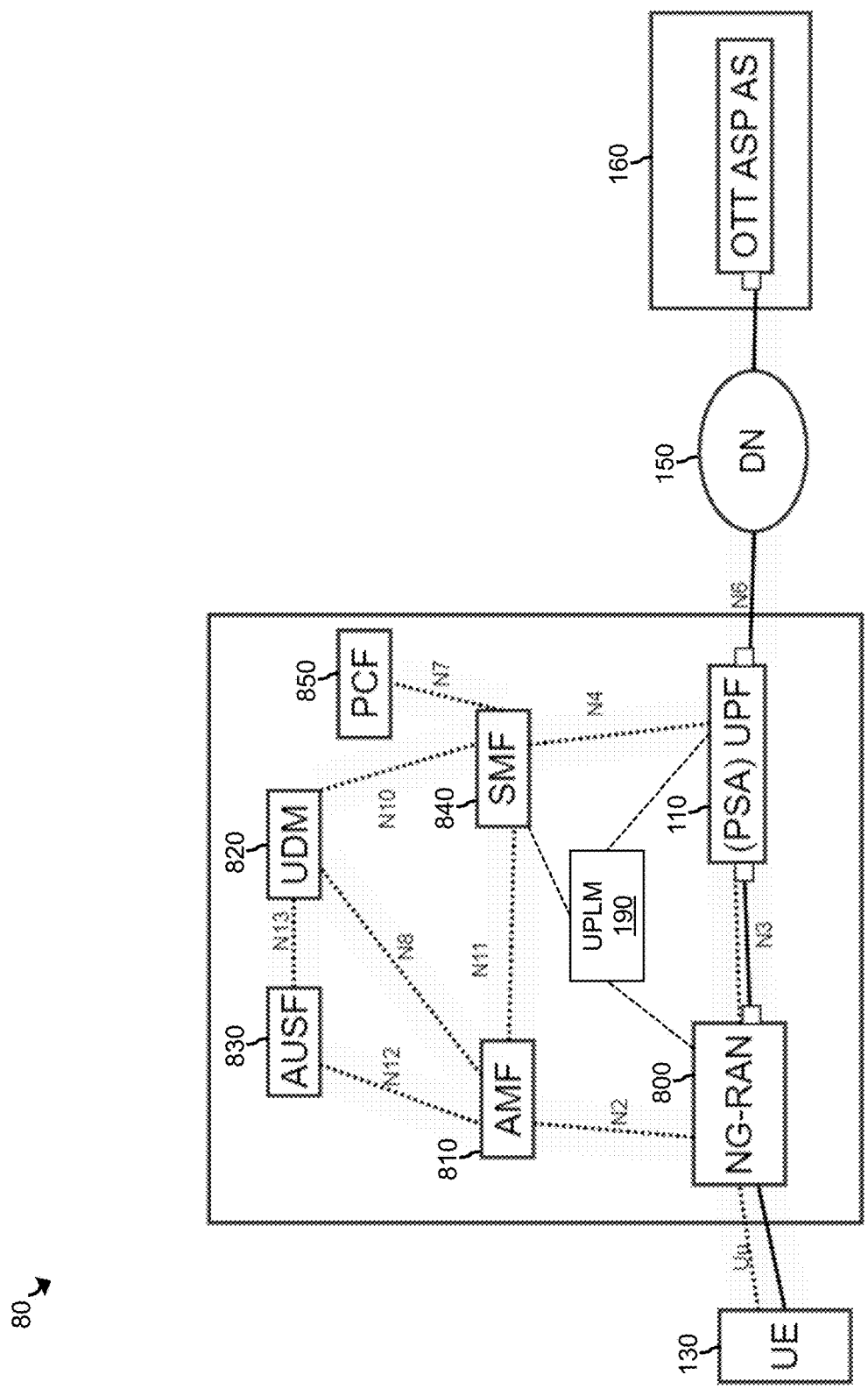
FIG. 8 is a block diagram of a cellular network according to an embodiment.

FIG. 8 is a block diagram of a cellular network 80, which can be the same as cellular network 10. Additional components of the cellular network are illustrated in FIG. 8 compared to FIG. 1.

Cellular network 80 includes 5GS network functions that are used to establish and control a flow of a protocol data unit (namely PDU flow) between an application server on the internet (OTT ASP AS) and an associated application 135 installed at a UE 130. For the sake of simplicity, not all network functions and interfaces are shown.

The UE 130 is in cellular communication with a next-generation (NG)-RAN 800 that includes base stations that can have connectivity to 5G core network functions such as AMF, SMF etc. Examples are gNB (5G New Radio (NR) interface supporting one or more base stations), en-gNB, (next generation evolved LTE base stations), and/or other non-3GPP-based Access Networks like WiFi. 5G NR supports various advanced 5G radio-frequency (RF) technologies such as massive multiple-input-multiple-output (MIMO), beamforming, cell densification, numerology, and so on. The NG-RAN 800 may have one or more base stations like gNB or ng-eNB that has the capability to connect 5G core (5GC) and DN 150 and may have connectivity to different physical networks differentiated by their associated network addresses. (e.g., IPv4, IPv6, etc.).

An Access and Mobility Management Function (AMF) 810 is in network communication with the NG-RAN 800 over an N2 network interface. The AMF 810 communicates with different access networks (3GPP or non-3GPP) over the N2 interface and manages which UEs 130 can access the 5GC to have PDU flow with data networks (DN) 150. The AMF 810 additionally supports data-flow relocation from one gNB to another in cases where UEs 130 move in order to support data session continuity.

A Unified Data Management (UDM) 820 is in network communication with the AMF 810 over an N8 network interface. The UDM 820 stores UE encryption keys to decrypt the UEs' SUCI (Subscriber Concealed Identifier) to SUPI for secure signaling over the air interface. The UDM 820 also stores subscription data for the UE 130. The UDM 820 is in network communication with an Authentication Server Function (AUSF) 830 over an N13 network interface. The AUSF 830 provides services to the UDM 820 that allow the UDM 820 to authenticate UEs and have connectivity through the 5GS.

A Session Management Function (SMF) 840 is in network communication with the UDM 820 (over an N10 network interface), the AMF 810 (over an N11 network interface), a Policy Charging Function (PCF) 850 (over an N7 network interface), and the PSA-UPF 110 (over an N4 network interface). The SMF 840 controls packet data sessions (one or more QoS Flows and/or PDU sessions) between the UE 130 and the DN 150. The SMF 840 can collect PCC (Policy and Charging Control) Rules from the PCF 850 and convert the PCC Rules into Service Data Flow (SDF) Templates, QoS Profiles, and QoS Rules for the PSA-UPF 110, gNB, and UE 130, respectively, for QoS Flows establishment, modification, and release.

The SMF 840 may store the following PDU session details: SUPI, data network name (DNN), Generic Public Subscription Identifier (GPSI), Radio Access Technology (RAT Type) (e.g. NR), data session ID, UE Internet Protocol (IP) v4 address, SBI (service based interface) information, QoS information (e.g., QoS Flow Identifier (QFI), QFI Type, QoS Flow Type, QoS profile info (5QI (5G QoS Identifier)/ ARP (Allocation/Retention Priority), priority level, UL/DL Maximum Bit Rate (MBR), Guaranteed Bit Rate (GBR), UP information (gNB N3-side Tunnel Endpoint Identifier (TEID), gNB n3-side IPv4 Address, UPF N3-side TEID, UPF n3-side IPv4 address, QFI). The access network (AN)-tunnel information can include gNB N3-side TEID and gNB n3-side IPv4 Address. The CN-tunnel information can include UPF N3-side TEID and UPF n3-side IPv4 address.

The SMF 840 can activate an end-to-end UL/DL packet delay measurement between UE 130 and the PSA-UPF 110 for a QoS Flow during the PDU Session Establishment or Modification procedure. The SMF 840 sends a QoS Monitoring request to the PSA-UPF 110 via the N4 network interface and the NG-RAN 800 via the N2 network interface signaling to request QoS monitoring between PSA-UPF 110 and NG-RAN 800. The QoS Monitoring request may contain monitoring parameters determined by the SMF 840 based on the local configuration.

The NG-RAN 800 initiates the RAN part of UL/DL packet delay measurement based on the QoS Monitoring request from the SMF 840. The NG-RAN 800 reports the RAN part of UL/DL packet delay result to the PSA-UPF 110 in the UL data packet.

The PSA-UPF 110 forwards UE traffic between the NG-RAN 800 and the DN 150. The PSA-UPF 110 can enforce QoS monitoring on UE's uplink and downlink traffic in 5GC using the SDF Templates sent by the SMF 840 over the N4 PFCP (Packet Forwarding Control Packet) interface for the UEs. The PSA-UPF 110 may perform mapping of user-plane packets to QoS Flows based on PDRs (Packet Detection Rules) which comprises packet handling instructions received from the SMF 840 over N4 PFCP Interface during the QoS Flow setup. The PDRs include downlink (DL) Packet Detection Information (PDI) to classify/match DL traffic using 5-tuple (e.g., Source and Destination IP Addresses, Source and Destination Port Numbers, Protocol) to map the DL traffic (e.g., SDF) to a QoS Flow (e.g., SDF Binding) within the PDU Session. The uplink (UL) PDI is used to verify that the UL traffic from the UE is mapped correctly to an appropriate QoS Flow or the PSA-UPF 110 will drop the UL traffic to the DN 150. During a data session, when UEs move around between service coverages of different gNBs, the IP Addresses and TCP/UDP port numbers of the UE and of the application server 160 (e.g., OTT ASP AS) connected over the DN 150 do not change no matter how many gNBs and/or (PSA-)UPFs are involved in between. The Generic/GPRS Tunneling Protocol for user plane (GTP-U) support this capability in the network 80.

The UPLM 190 is directly or indirectly in network communication with the SMF 840. For example, the UPLM 190 can be in network communication with the SMF 840 via the NG-RAN 800 or via the PSA-UPF 110. In another example, the UPLM 190 is part of a network component in a 5GS such as the SMF 840.

In an aspect, the UPLM 190 performs a detailed analysis of the NG-RAN 800 and 5GC user-plane latency measures to dynamically modify NG-RAN parameters if conditions satisfy.

For both time synchronized and not time synchronized NG-RAN 800 and PSA-UPF 110, the PSA-UPF 110 creates and sends the monitoring packets to the RAN in a measurement frequency, determined by the PSA-UPF 110, taking the reporting frequency for QoS Monitoring received from the SMF 840 into account. The PSA-UPF 110 encapsulates in the GTP-U header with QFI, QoS Monitoring Packet (QMP) indicator (which indicates the packet is used for UL/DL packet delay measurement) and the local time T1 when the PSA-UPF sends out the DL monitoring packets. The NG-RAN 800 records the local time T1 received in the GTP-U header and the local time T2 at the reception of the DL monitoring packets. When receiving an UL packet from UE 130 for that QFI or when the NG-RAN 800 sends a dummy UL packet as monitoring response (in case there is no UL service packet for UL packet delay monitoring), the NG-RAN 800 encapsulates the QMP indicator, the RAN part of UL/DL packet delay result, the time T1 received in the GTP-U header, the local time T2 at the reception of the DL monitoring packet, and the local time T3 when the NG-RAN 800 sends out this monitoring response packet to the PSA-UPF 110 via the N3 network interface, in the GTP-U header of the monitoring response packet. The PSA-UPF 110 records the local time T4 when receiving the monitoring response packets and calculates the round trip (if not time synchronized) or UL/DL packet delay (if time synchronized) between the NG-RAN 800 and the anchor PSA-UPF 110 based on the time information contained in the GTP-U header of the received monitoring response packet.

If the NG-RAN 800 (e.g., gNB or base station 100) and the PSA-UPF 110 are not time synchronized, the PSA-UPF 110 calculates the UL/DL packet delay between the NG-RAN 800 and the PSA-UPF 110 based on the (T2−T1+T4−T3)/2, where the times T1-T4 are illustrated in FIGS. 1-4. If the NG-RAN and PSA-UPF are time synchronized, the PSA-UPF 110 calculates the UL packet delay and DL packet delay between the NG-RAN 800 and the PSA-UPF 110 based on (T4−T3) and (T2−T1), respectively. The PSA-UPF 110 calculates the UL/DL packet delay between UE 130 and the PSA-UPF 110 based on the received RAN part of UL/DL packet delay result and the calculated UL/DL packet delay between RAN and PSA-UPF 110. The PSA-UPF 110 reports the results to the SMF 840 based on some specific condition, e.g. when a threshold (e.g., threshold time) for reporting to SMF 840 is reached.

For cases where the NG-RAN 800 (e.g., gNB or base station 100) and PSA-UPF 110 are time synchronized, the UPLM 190 can request/receive measurements from gNB which may include DL user packet delay from PSA-UPF 110 to NG-RAN 800 (calculated from T2−T1) and UE 130 to/from NG-RAN 800 user packet delay as [(T3−T2)]/2, where the times T1-T3 are illustrated in FIGS. 1-4.

The UPLM 190 does not need the PSA-UPF 110 return time measurement (T4) when the NG-RAN 800 and PSA-UPF 110 are time synchronized and one or more RAN latency alert flag is received in an extended QoS Monitoring packet by NG-RAN 800 that indicates that the UL packet delay from the NG-RAN 800 to the PSA-UPF 110 (calculated from T4−T3) is less than or equal to the DL packet delay from the PSA-UPF 110 to NG-RAN 800 (calculated from T2−T1) associated with the first/previous App RSD packet 180.

One or more of the following latency measurements can be used to determine whether to perform dynamic radio framing.

A=End-to-end one-way (UE 130 to/from PSA-UPF 110) user packet delay in MCN (time-synchronized)=Sum of "B" and "C" in ms, as illustrated in Equation 1.

B=One-way DL user-plane packet delay contribution between NG-RAN and PSA-UPF (time-synchronized)=T2−T1 (ms), as illustrated in Equation 2.

C=One-way UL/DL user-plane packet delay contribution in NG-RAN to/from UE (time synchronized or not time synchronized)=(T3−T2)/2 (ms), as illustrated in Equation 3.

D=Ratio of user-plane packet delay contribution in (NG-RAN to/from UE) to end-to-end one-way (UE to/from PSA-UPF) user packet delay in mobile communication network (time-synchronized)=C/(B+C), as illustrated in Equation 4, which can be expressed as a percentage.

E=RTT (round trip time) user-plane packet delay contribution in NG-RAN to/from UE (time synchronized or not time synchronized)=T3−T2 (in ms).

F=RTT (round trip time) user-plane packet delay contribution in PSA-UPF to/from UE (time synchronized or not time synchronized)=T4−T1 (in ms).

G=One-way UL/DL user-plane packet delay contribution in PSA-UPF to/from UE (time synchronized or not time synchronized)=(T4−T1)/2 (in ms).

H=Ratio of user-plane packet delay contribution in (NG-RAN to/from UE) to end-to-end one-way (UE to/from PSA-UPF) user packet delay in mobile communication network (time synchronized or not time synchronized)=(T3−T2)/(T4−T1).

I=UL packet delay from NG-RAN 800 to the PSA-UPF 110 in mobile communication network (time synchronized)=(T4−T3) (in ms).

J=Difference of DL user-plane packet delay contribution between NG-RAN and PSA-UPF and UL packet delay (time synchronized)=(T2−T1)−(T4−T3) (in ms).

These latency measurements are summarized in Table 5.

TABLE 5

| Latency Measurement | Description | Formula | Sample Value |
|---|---|---|---|
| A | End-to-end one-way (UE to/from PSA UPF) user packet delay in mobile communication network (time-synchronized) | B + C | 160 ms |
| B | One-way DL user-plane packet delay contribution between NG-RAN and PSA-UPF (time-synchronized) | T2 − T1 | 32 ms |
| C | One-way UL/DL user-plane packet delay contribution in NG-RAN to/from UE (time synchronized or not time synchronized) | (T3 − T2)/2 | 128 ms |
| D | Ratio of user-plane packet delay contribution in NG-RAN to end-to-end one-way (UE to/from PSA UPF) user packet delay in mobile communication network (time-synchronized) | B/(B + C) | 0.8 |
| E | RTT (round trip time) user-plane packet delay contribution in NG-RAN to/from UE (time synchronized or not time synchronized) | T3 − T2 | 256 ms |
| F | RTT (round trip time) user-plane packet delay contribution in PSA-UPF to/from UE (time synchronized or not time synchronized) | T4 − T1 | 320 ms |
| G | One-way UL/DL user-plane packet delay contribution in PSA-UPF to/from UE (time synchronized or not time synchronized) | (T4 − T1)/2 | 160 ms |
| H | Ratio of user-plane packet delay contribution in (NG-RAN to/from UE) to end-to-end one-way (UE to/from PSA-UPF) user packet delay in mobile communication network (time synchronized or not time synchronized) | C/G | 0.8 |
| I | UL packet delay from NG-RAN 800 to the PSA-UPF 110 in mobile communication network (time synchronized) | (T4 − T3) | 32 ms |
| J | DL packet delay − UL packet delay (time synchronized) | B − I | 0 ms |

The UPLM 190 is configured to use a local policy (e.g., associated with a serving PLMN (Public Land Mobile Network)) associated with an OTT internet application service provider (OTT-IASP) which may have an associated application already installed at the UE 130 of a subscriber of a mobile communication network (MCN) (e.g., network 80) of which subscription to the MCN is managed by subscriber identity module technologies such as eSIM in the UE 130 and corresponding databae/eitr (e.g. UDM, UDR) in the MCN. The UE may already have completed an authorization/authentication/registration at the application level to the application 135 of the OTT-IASP so that the users credentials (e.g., credit card details for on-demand service-related transaction needs) are already stored in the application server.

A local latency policy associated with OTT-IASP may also be provided by an OTT IASP admin who fills in the details of application-specific temporary requests from the MCN on the network provider admin portal web page which causes a policy database to comprise this info. Some example attributes of application-specific policy can include (a) application metrics and thresholds (e.g., user-plane latency; threshold), (b) on-demand service application traffic descriptors comprising one or more of (b.1) traffic filtering data (e.g., application server endpoint IP address(es), subnets, ports, protocol type (TCP, UDP), (b.2) geographic area indicator data (e.g., two or more (latitude, longitude) data points, exports from geo-tools, area zip codes, street addresses etc.), and/or (b.3) time window data (e.g., specific time window which can be a combination of hours and days (e.g., day 1 (mm/dd/yy): 1600 to 2300 hrs.; day 2 (mm/dd+1/yy): 1400 to 1600 hrs.).

The UPLM 190 may receive a snapshot configuration of the MCN (e.g., base station and/or antenna coordinates (latitude, longitude), site names and/or site identifiers, cell names and/or cell identifiers, antenna azimuth, and/or antenna beamwidth, etc.) from a table exported from a master planning database. (e.g., a radio network design tool export, such as Atoll). The UPLM 190 using the policy database and the master planning database then determines which base stations are associated with the geographical area indicators (b.2) provided by the OTT-IASP.

The UPLM 190 can use another table (e.g., local operator policies for network connectivity (e.g., HLD—high level design documents)), exports from MCN network manager software associated with the NG RAN 800 and/or 5GS. The UPLM 190 can additionally use another database including MCN operator local policy data for network connectivity giving details on how network components are associated with each other (e.g., MCN HLD—high level design documents, configuration data exports from various network components (e.g. NG RAN 800, SMF 840) in the 5GS).

The UPLM 190 then determines a mapping of the NR BS (base stations) to their associated AMF 810, SMF 840, and PSA-UPFs.110 (e.g., BS1 to PSA-UPF1; BS2 to PSA-UPF2; etc.).

The UPLM 190 may also receive further network configuration settings such as OFDM numerology indexes associated with subcarrier spacing (SCS) and cyclic prefix (CP) values, DRX mode settings, long and/or short DRX duration and timers.

The UPLM 190 initiates, utilizes, and/or subscribes to an extended QoS monitoring in the 5G mobile communication system at base stations 100 (e.g., gNBs) and/or at PSA-UPF(s) 110 directly or indirectly via the SMF 840, or via the network management interfaces of involved nodes. Extended QoS monitoring enables UL/DL user packet delay measurement between UE 130 and PSA-UPF 110 on different levels of granularities (e.g., per QoS flow per UE level or per GTP-U path level), subject to the operator's configuration.

The UPLM 190 can schedule one or more jobs to initiate and stop extended QoS monitoring measurements at associated base station(s) 100 (e.g., gNB(s)) and associated PSA-UPF(s) 110 in accordance with the application server 160 (e.g., OTT IASP AS) application-specific policies (a), (b-1), (b-2), (b-3), such as application server IP address, port, protocol type, protocol port (virtual number to differentiate protocol level sessions), date/time, etc. As a result, after extended QoS monitoring measurements start, user-plane packet delay measurements for QoS Flows associated with application server 160 (e.g., OTT IASP AS) (e.g., with identifiers such as one or more application server IP address (v4 or v6), protocol type (TCP, UDP), protocol port) may occur at associated PSA-UPFs 110 and associated gNBs (e.g., that can be mapped from geographical identifiers received from the application server 160 (e.g., OTT IASP AS)).

Figure 9:
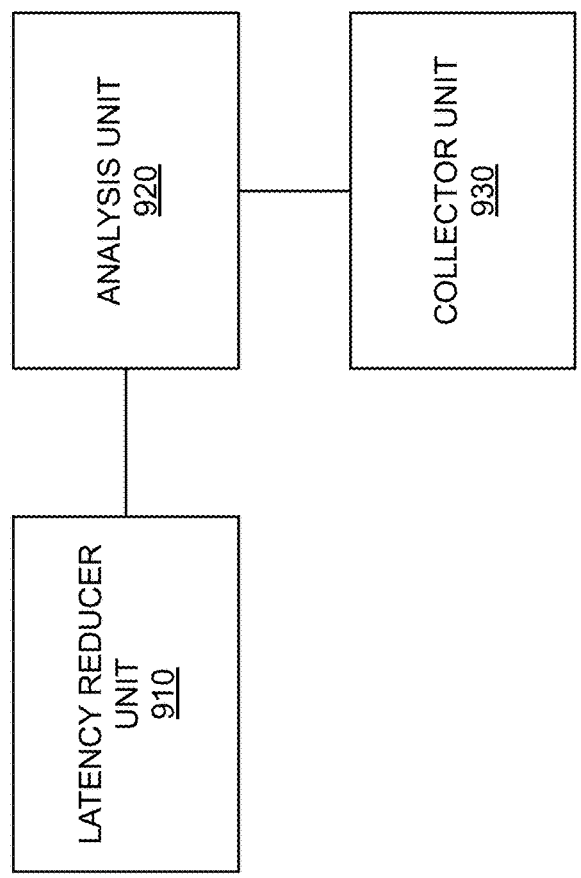
FIG. 9 is a block diagram of a user-plane latency manager according to an embodiment.

FIG. 9 is a block diagram of the UPLM 190 according to an embodiment. The UPLM 190 can include a latency-reducer unit 910, an analysis unit 920, and/or a collector unit 930.

The collector unit 930 can request and/or receive extended QoS Monitoring measurements from gNB and PSA-UPF 110 together with associated AN Tunnel (i.e., gNB-IPv4/v6 address and gNB N3 side TEID) and CN Tunnel (i.e., UPF N3 side TEID, UPF N3 IPv4/v6 address) information, respectively. Alternatively, the UPLM 190 may use the SMF 840 to request and/or receive extended QoS Monitoring measurements (and the tunnel information) which in this case SMF 840 can collect the extended QoS Monitoring measurements from gNB and PSA-UPF 110 and send to UPLM 190.

The collector unit 930 may further receive user-plane latency measurements (i.e., extended QoS monitoring measurements) from the base station (e.g. gNB) associated with the AN-tunnel which is determined by (gNB-IPv4/v6 address and gNB N3 side TEID (Tunnel Endpoint Identifier)) when the base station and PSA-UPF 110 are time synchronized.

The analysis unit 920 can determine certain QoS monitoring measures, such as the sum of the one-way delay 5G core user-plane latency contribution and the one-way RAN latency contribution, as provided in Equation 1, and/or the ratio of the one-way RAN latency contribution to the one-way end-to-end packet delay, as provided in Equation 4. The analysis unit 920 can compare these QoS monitoring measures with respective thresholds and can output a trigger signal when one or more thresholds is/are exceeded.

The latency-reducer unit 910 can produce modified OFDM numerology (SCS, CP) settings and/or DRX-related settings and post the changes at the gNB associated with the UE 130. The OFDM numerology (SCS, CP) settings and/or DRX-related settings can be produced after receiving the triggering signal from the analysis unit 920. The latency-reducer unit 910 may receive the current snapshot of OFDM numerology (SCS, CP) settings and/or DRX-related settings currently associated with the UE 130. The UE 130 may be assigned one or more DRBs and one AN (Access Network) tunnel (gNB-IPv4/v6 address and gNB N3 side TEID) in the gNB. Determining new settings in the latency reducer unit 910 may be comprised of utilizing a potential candidate list of settings which may be created by pre-calculated theoretical user-plane latency/RTT measures associated with the changes and/or from previously applied changes and their associated previously resulting user-plane latency/RTT measures.

With the novelty of this approach, a network component of a mobile cellular communication network comprising UPLM 190 is configured to initiate an application-associated extended "QoS monitoring" mechanism to determine measures of packet latencies from the first (extended QoS monitoring) packet received from the UE and based on the determined measures of packet latencies from the first packet received, the network component is further configured to determine the RAN latency alert flag value and append/couple it to a second packet sent to a base station (e.g., gNB). The base station, having received the second (extended QoS monitoring) packet with one or more RAN latency alert flag(s) as set to one, determines the second packet end-to-end (the network component to/from UE) delay measures. The second packet end-to-end delay measures are determined regardless of whether the network components (e.g., PSA-UPF, base station) including UPLM 190 are time synchronized.

When a UE 130 is powered under a 5G service coverage, the UE 130 performs various levels of registration procedures with the network (e.g., PLMN selection, cell selection, tracking area update, and so on) which involves checking if the UE 130 has a valid and authentic (e.g., AUSF-acknowledged) subscription with the network to transfer data within. After successful registration with the network, the UE 130 becomes a part of the network and can request to receive network resources to send and receive data. By pressing the application icon installed at the UE 130, a subscriber of an MCN may initiate a PDU Session Establishment request to AMF 810 via the gNB over the N1 network interface. This is done to trigger the establishment of a default data pipe (so called default QoS Flow) between the UE 130 and the data network. The UE 130 may then use the default QoS flow inside the established PDU session to exchange user-plane data packets with the application server 160 (e.g., OTT IASP AS) and a non-GBR type QoS flow (e.g., 5QI-6, 5QI-8, and/or 5QI-9 3GPP standard 5G quality indicators) is used namely best-effort bearer. After a successful PDU session establishment, a default QoS Flow is created for each UE 130 to exchange data packets with the application server(s) 160 connected via the DN 150. A DRB 140 is established by the gNB (e.g., base station 100) for the UE 130 to stretch/extend PSA-UPF 5GS tunnel 120 to the UE 130. The 5GS tunnel 120 is a combination of identifiers allocated and maintained by the network and composed of (gNB N3 side TEID, gNB N3 IPv4 Address, UPF N3 side TEID, UPF N3 IPv4 address, QFI).

The SMF 840 controls the traffic detection at the PSA-UPF 110 by providing detection information for every PDR. For iPv4 or IPv6 PDU session type, detection information is a combination of CN tunnel info, QFI, IP packet filter set, and an application identifier (e.g., an index to a set of application detection rules configured in the PSA-UPF 110).

FIG. 10 is a flow chart of a method 1000 for dynamic radio framing in a cellular wireless network according to an embodiment.

In step 1001, it is determined whether one or more application data packets, transmitted over the cellular wireless radio network between a cellular mobile device (e.g., UE 130) and an application server (e.g., application server 160) are covered by a local latency policy. The local latency policy can be associated with or requested by an application service provider that owns or controls the application server and that provides an application (e.g., an OTT application), such as application 135, running on the cellular mobile device. The local latency policy can include on-demand service application traffic descriptors that can be used to determine whether the application data packets are covered by (or invoke) the local latency policy. Step 1001 can be performed by a network component (e.g., PSA-UPF 110), the base station 100, and/or the UPLM 190.

In step 1002, one or more one-way user-plane latency packet delays associated with the application data packets is/are determined using timestamps appended to the header data of a first data packet and a first response (from the cellular mobile device) of the first data packet sent between the cellular wireless network and the cellular mobile device. The timestamps can be appended to the header data of the first data packet by a network component (e.g., PSA-UPF 110) and the base station 100. The first data packet (and the response of the first data packet from the UE) can be a first QoS monitoring packet. Step 1002 can be performed by a network component (e.g., PSA-UPF 110) and/or the UPLM 190.

The one-way user-plane latency packet delay(s) can include the RAN-E2E ratio and/or a relative UL/DL packet delay measurement. The relative UL/DL packet delay measurement compares the DL (PSA-UPF 110 to base station 100 (NG-RAN) latency contribution to the UL (base station 100 (NG-RAN) to PSA-UPF 110) latency contribution. The relative UL/DL packet delay measurement can be determined when the network components and the base station are time-synchronized.

In step 1003, it is determined whether one or more user-plane packet delays is/are higher than respective one or more user-plane latency thresholds defined in the local latency policy. The user-plane latency threshold(s) defined in the local latency policy can include a minimum ratio threshold, a maximum ratio threshold, and/or a minimum relative UL/DL packet delay threshold. The RAN-E2E ratio is compared to the minimum ratio threshold and the maximum ratio threshold. The minimum relative UL/DL packet delay threshold can be set to 0 such a RAN latency alert flag is set when the DL latency contribution is higher than or equal to the UL latency contribution (e.g., DL latency contribution—UL latency contribution≥0), such that there is a maximum difference between the DL latency contribution and the UL latency contribution.

If one or more user-plane packet delays is/are lower than or equal to the respective one or more user-plane latency thresholds defined in the local latency policy, the method 1000 returns to step 1001.

If one or more user-plane packet delays is/are higher than the respective one or more user-plane latency thresholds defined in the local latency policy, the method 1000 proceeds to step 1004 where one or more RAN latency alert flags is/are appended to a header of a second data packet sent from the network component to the UE over the tunnel (e.g., sent through the cellular wireless network). The RAN latency alert flag(s) can include a RAN Latency Alert Minimum Radio-ratio Latency Indication, a RAN Latency Alert Maximum Radio-ratio Latency Indication, and/or a RAN Latency Alert UL/DL Latency Indication. The RAN Latency Alert Minimum Radio-ratio Latency Indication flag is set when the RAN-E2E ratio is higher than the minimum ratio threshold. In some embodiments, the RAN Latency Alert Minimum Radio-ratio Latency Indication flag is set when the RAN-E2E ratio is between the minimum ratio threshold and the maximum ratio threshold. The RAN Latency Alert Maximum Radio-ratio Latency Indication flag is set when the RAN-E2E ratio is higher than the maximum ratio threshold. The RAN Latency Alert UL/DL Latency Indication is set when the DL latency contribution is higher than or equal to the UL latency contribution.

The second data packet (and the response of the second data packet from the UE) can be a second QoS monitoring packet. Steps 1003 and 1004 can be performed by a network component (e.g., PSA-UPF 110) and/or the UPLM 190.

In step 1005, one or more radio-framing parameters is/are dynamically changed in response to one or more of the latency alert flag(s), timestamps and thresholds. The radio-framing parameter(s) reduce a data-transmission latency between the base station and the cellular mobile device. The radio-framing parameters can include OFDM numerology settings and/or DRX settings. Step 1005 can be performed according to method 50. Step 1005 can be performed by the base station associated with the cellular mobile device and/or by the UPLM.

After step 1005, the method 1000 can return to step 1001 (e.g., in a loop).

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method for dynamic radio framing in a cellular wireless network, comprising:
    determining, with a network component of the cellular wireless network, that a transmission of application data packets through the cellular wireless network between a cellular mobile device and an application server is covered by a local latency policy, the cellular mobile device running an application that is associated with the application server;

determining, with the network component, one or more user-plane latency packet delays associated with the application data packets, the one or more user-plane packet delays determined using first timestamps appended to header data of a first data packet, the first data packet sent from the cellular wireless network to the cellular mobile device and from the cellular mobile device to the cellular wireless network;

when the one or more user-plane packet delays is/are higher than respective one or more user-plane latency thresholds defined in the local latency policy, appending and setting, by the network component, one or more latency alert flags in a header of a second data packet sent from the network component to a base station; and dynamically changing, with the base station in response to the one or more latency alert flag(s) and second timestamps associated with the second data packet, one or more radio-framing parameters to reduce a data-transmission latency between the base station and the cellular mobile device.

2. The method of claim 1, wherein the local latency policy defines on-demand service application traffic descriptors.

3. The method of claim 2, wherein the on-demand service application traffic descriptors include traffic filtering data and/or time window data.

4. The method of claim 1, wherein:

the one or more user-plane packet delays include a one-way radio ratio user-plane packet delay defined as a ratio of a one-way radio user-plane packet delay with respect to a one-way end-to-end user-plane packet delay, the one-way radio user-plane packet delay defined between the network component and the cellular mobile device, the one-way radio user-plane packet delay defined between the base station and the cellular mobile device, the respective one or more user-plane latency thresholds include a minimum one-way radio ratio user-plane latency threshold, and the one or more latency alert flags include a minimum RAN latency alert radio-ratio latency indication flag, the minimum RAN latency alert radio-ratio latency indication flag set and appended when the one-way radio ratio user-plane packet delay is higher than the minimum one-way radio ratio user-plane latency threshold.

5. The method of claim 4, wherein:

the respective one or more user-plane latency thresholds include a maximum one-way radio ratio user-plane latency threshold, and the one or more latency alert flags include a maximum RAN latency alert radio-ratio latency indication flag, the maximum RAN latency alert radio-ratio latency indication flag set and appended when the one-way radio ratio user-plane packet delay is higher than the maximum one-way radio ratio user-plane latency threshold.

6. The method of claim 5, wherein the minimum RAN latency alert radio-ratio latency indication flag set and appended when the one-way radio ratio user-plane packet delay is between the minimum one-way radio ratio user-plane latency threshold and the maximum one-way radio ratio user-plane latency threshold.

7. The method of claim 5, wherein:

the base station and the network component are time-synchronized, the one or more user-plane packet delays include a relative UL/DL packet delay that compares a downlink (DL) packet delay from the network component to the base station to an uplink (UL) packet delay from the base station to the network component, the respective one or more user-plane latency thresholds include a maximum DL/UL delay difference between the DL packet delay and the UL packet delay, and the one or more latency alert flags include a RAN latency alert UL/DL latency indication flag, the RAN latency alert UL/DL latency indication flag set and appended when the relative UL/DL packet delay is higher than or equal to the maximum DL/UL delay difference.

8. The method of claim 7, wherein:

the one-way radio ratio user-plane packet delay is a first one-way radio ratio user-plane packet delay, and the method further comprises:

determining, with the base station, a second one-way radio ratio user-plane packet delay using the second timestamps;

comparing, with the base station, the second one-way radio ratio user-plane packet delay with the minimum one-way radio ratio user-plane latency threshold and the maximum one-way radio ratio user-plane latency threshold;

when the second one-way radio ratio user-plane packet delay is higher than the maximum one-way radio ratio user-plane latency threshold, dynamically assigning the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and when the second one-way radio ratio user-plane packet delay is between the maximum one-way radio ratio user-plane latency threshold and the minimum radio ratio user-plane latency threshold, dynamically assigning the cellular mobile device to a different discontinuous reception (DRX) setting than a current DRX setting of the cellular mobile device, thereby reducing the data-transmission latency between the base station and the cellular mobile device.

9. The method of claim 6, wherein:

the base station and the network component are not time-synchronized, and the method further comprises:

determining, with the base station, a one-way radio packet delay using the second timestamps, the one-way packet delay defined between the base station and the cellular mobile device;

comparing, with the base station, the one-way packet delay with a one-way radio packet delay threshold;

when the one-way radio packet delay is higher than the one-way radio packet delay threshold and the maximum RAN latency alert radio-ratio latency indication flag is set, dynamically assigning the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and when the one-way radio packet delay is higher than the one-way radio packet delay threshold and the minimum RAN latency alert radio-ratio latency indication flag is set, dynamically assigning the cellular mobile device to a different discontinuous reception (DRX) setting than a current DRX setting of the cellular mobile device, thereby reducing the data-transmission latency between the base station and the cellular mobile device.

10. A communications system comprising:
a base station of a cellular wireless network;
a network component of the cellular wireless network, the network component including:
one or more processors; and
non-transitory memory in communication with the one or more processors, the non-transitory memory storing computer-readable instructions that, when executed by the one or more processors, cause the one or more processors to:
determine that a transmission of application data packets through the cellular wireless network between a cellular mobile device and an application server is covered by a local latency policy, the cellular mobile device running an application that is associated with the application server;
determine one or more user-plane latency packet delays associated with the application data packets, the one or more user-plane packet delays determined using first timestamps appended to header data of a first data packet, the first data packet sent from the network component to the cellular mobile device via the base station and from the cellular mobile device to the network component via the base station; and
when the one or more user-plane packet delays is/are higher than respective one or more user-plane latency thresholds defined in the local latency policy, appending and setting, by the network component, one or more latency alert flags in a header of a second data packet sent from the network component to a base station;
wherein the base station is configured to:
detect the one or more latency alert flags in the header of the second data packet, the base station in radio communication with the cellular mobile device; and
dynamically change one or more radio-framing parameters, in response to the one or more latency alert flags and second timestamps associated with the second data packet, one or more radio-framing parameters to reduce a data-transmission latency between the base station and the cellular mobile device.

11. The communications system of claim 10, further comprising a user-plane latency manager (UPLM) configured to:
store the local latency policy;
send the one or more user-plane latency thresholds to the network component and the base station; and
cause the base station to dynamically change the one or more radio-framing parameters.

12. The communications system of claim 11, wherein:
the local latency policy defines on-demand service application traffic descriptors including traffic filtering data and/or time window data, and
the UPLM is configured to send the on-demand service application traffic descriptors to the network component and the base station.

13. The communications system of claim 10, wherein:
the one or more user-plane packet delays include a one-way radio ratio user-plane packet delay defined as a ratio of a one-way radio user-plane packet delay with respect to a one-way end-to-end user-plane packet delay, the one-way end-to-end user-plane packet delay defined between the network component and the cellular mobile device, the one-way radio user-plane packet delay defined between the base station and the cellular mobile device, the respective one or more user-plane latency thresholds include a minimum one-way radio ratio user-plane latency threshold, and
the one or more latency alert flags include a minimum RAN latency alert radio-ratio latency indication flag, the minimum RAN latency alert radio-ratio latency indication flag set and appended when the one-way radio ratio user-plane packet delay is higher than the minimum one-way radio ratio user-plane latency threshold.

14. The communications system of claim 13, wherein:
the respective one or more user-plane latency thresholds include a maximum one-way radio ratio user-plane latency threshold,
the one or more latency alert flags include a maximum RAN latency alert radio-ratio latency indication flag, the maximum RAN latency alert radio-ratio latency indication flag set and appended when the one-way radio ratio user-plane packet delay is higher than the maximum one-way radio ratio user-plane latency threshold, and
the minimum RAN latency alert radio-ratio latency indication flag is set and appended when the one-way radio ratio user-plane packet delay is between the minimum one-way radio ratio user-plane latency threshold and the maximum one-way radio ratio user-plane latency threshold.

15. The communications system of claim 10, wherein
the base station and the network component are time-synchronized,
the one or more user-plane packet delays include a relative UL/DL packet delay that compares a downlink (DL) packet delay from the network component to the base station to an uplink (UL) packet delay from the base station to the network component,
the respective one or more user-plane latency thresholds include a maximum DL/UL delay difference between the DL packet delay and the UL packet delay, and
the one or more latency alert flags include a RAN latency alert UL/DL latency indication flag, the RAN latency alert UL/DL latency indication flag set and appended when the relative UL/DL packet delay is higher than or equal to the maximum DL/UL delay difference.

16. The communications system of claim 14, wherein:
the one-way radio ratio user-plane packet delay is a first one-way radio ratio user-plane packet delay, and
the base station is further configured to:
determine a second one-way radio ratio user-plane packet delay using the second timestamps;
compare the second one-way radio ratio user-plane packet delay with the minimum one-way radio ratio user-plane latency threshold and the maximum one-way radio ratio user-plane latency threshold;
when the second one-way radio ratio user-plane packet delay is higher than the maximum one-way radio ratio user-plane latency threshold, dynamically assign the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and
when the second one-way radio ratio user-plane packet delay is between the maximum one-way radio ratio user-plane latency threshold and the minimum radio ratio user-plane latency threshold, dynamically assign the cellular mobile device to a different discontinuous reception (DRX) setting than a current DRX setting of the cellular mobile device, thereby reducing the data-transmission latency between the base station and the cellular mobile device.

17. The communications system of claim 14, wherein:
the base station and the network component are not time-synchronized, and
the base station is further configured to:
determine a one-way radio packet delay using the second timestamps, the one-way packet delay defined between the base station and the cellular mobile device;
compare the one-way packet delay with a one-way radio packet delay threshold;
when the one-way radio packet delay is higher than the one-way radio packet delay threshold and the maximum RAN latency alert radio-ratio latency indication flag is set, dynamically assign the cellular mobile device to a higher orthogonal frequency division multiplexing (OFDM) numerology setting compared to a current OFDM numerology setting of the cellular mobile device, thereby reducing the data-transmission latency between the base station and the cellular mobile device; and
when the one-way radio packet delay is higher than the one-way radio packet delay threshold and the minimum RAN latency alert radio-ratio latency indication flag is set, dynamically assign the cellular mobile device to a different discontinuous reception (DRX) setting than a current DRX setting of the cellular mobile device, thereby reducing the data-transmission latency between the base station and the cellular mobile device.

18. One or more non-transitory computer-readable media storing processor-readable instructions that, when executed by a processor, cause the processor to:
determine that a transmission of application data packets through the cellular wireless network between a cellular mobile device and an application server is covered by a local latency policy, the cellular mobile device running an application that is associated with the application server;
determine one or more user-plane latency packet delays associated with the application data packets, the one or more user-plane packet delays determined using first timestamps appended to header data of a first data packet, the first data packet sent from a network component to the cellular mobile device via the base station and from the cellular mobile device to the network component via the base station; and
when the one or more user-plane packet delays is/are higher than respective one or more user-plane latency thresholds defined in the local latency policy, appending and setting, by the network component, one or more latency alert flags in a header of a second data packet sent from the network component to a base station.

* * * * *